(12) United States Patent
Sugaya et al.

(10) Patent No.: US 7,489,651 B2
(45) Date of Patent: Feb. 10, 2009

(54) WIRELESS COMMUNICATION SYSTEM, WIRELESS COMMUNICATION APPARATUS, WIRELESS COMMUNICATION METHOD, AND COMPUTER PROGRAM

(75) Inventors: Shigeru Sugaya, Kanagawa (JP); Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 627 days.

(21) Appl. No.: 11/134,394

(22) Filed: May 23, 2005

(65) Prior Publication Data

US 2005/0276243 A1 Dec. 15, 2005

(30) Foreign Application Priority Data

Jun. 9, 2004 (JP) .............................. 2004-171860

(51) Int. Cl.
*H04Q 7/20* (2006.01)
(52) U.S. Cl. ....................... 370/322; 370/341; 370/329; 455/450; 455/452.1; 455/452.2
(58) Field of Classification Search ................ 370/310, 370/310.2, 328, 329, 332, 321, 341, 338, 370/348, 395.54, 395.42, 394, 487, 322; 709/241, 238; 455/403, 452.1, 452.2, 41.2, 455/450
See application file for complete search history.

(56) References Cited

U.S. PATENT DOCUMENTS 5,583,860 A * 12/1996 Iwakawa et al. ............ 370/232

| | | | |
|---|---|---|---|
| 6,694,139 B1 * | 2/2004 | Sugaya et al. ............... | 455/450 |
| 6,704,932 B1 * | 3/2004 | Matsunaga et al. .......... | 725/126 |
| 2002/0035641 A1 * | 3/2002 | Kurose et al. ............... | 709/241 |
| 2004/0037294 A1 * | 2/2004 | Yamaguchi et al. ..... | 370/395.42 |
| 2004/0043780 A1 * | 3/2004 | Sugaya et al. ............... | 455/500 |
| 2004/0053621 A1 * | 3/2004 | Sugaya et al. ............... | 455/450 |
| 2005/0059420 A1 * | 3/2005 | Salokannel et al. ......... | 455/522 |

* cited by examiner

*Primary Examiner*—Jean A Gelin
(74) *Attorney, Agent, or Firm*—Oblon, Spivak, McClelland, Maier & Neustadt, P.C.

(57) ABSTRACT

In the case where there is a conflict over a band between communication stations that have reserved the band, the communication stations mediate and avoid the conflict of reservation use with low-load processing. In a wireless communication system, band reservation use is permitted, and a plurality of reservation types are provided according to priority of communication. A communication station that performs reservation use describes a reservation type and a rock-paper-scissors value in a beacon. When there occurs a conflict of reservation use at some area, reservation use having higher priority remains, and a communication station that has performed reservation use having a lower priority moves it to another area. In the case where there is a conflict between reservations having the same priority, the communication apparatuses that have performed reservation use perform control by rock-paper-scissors between themselves, and move the reservation of the apparatus that has lost by the judgment.

17 Claims, 17 Drawing Sheets

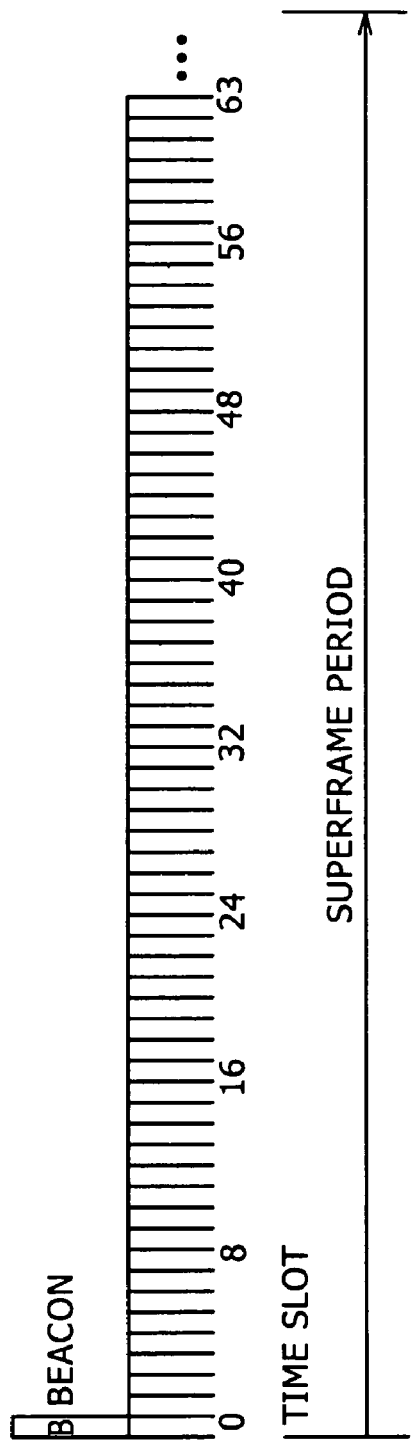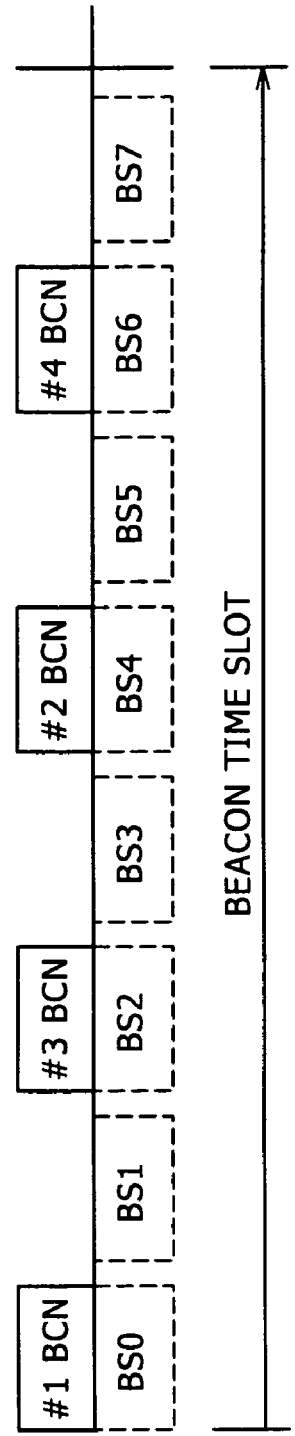

FIG. 5

| Type | Length | Rx Address | Tx Address | HCS | Group ID | Slot Structure | ROCK-PAPER-SCISSORS VALUE | Attribute | FCS |

| 253 | 1 |
|---|---|
| 254 | 1 |
| 255 | 3 |

| SLOT NUMBER | 0 | 1 | 2 | 3 | 4 | 5 | 6 | 7 | 8 | 9 | 10 | 11 |
|---|---|---|---|---|---|---|---|---|---|---|---|---|
| SET VALUE | 7 | 3 | 3 | 7 | 5 | 6 | 6 | 1 | 7 | 7 | 7 | 7 |

FIG.6

| USE STATUS | STATUS | PRIORITY SETTING |
|---|---|---|
| 7 | STRONG RESERVATION USE SETTING | FIRST PRIORITY |
| 6 | ADJACENT STRONG RESERVATION USE | — |
| 5 | WEAK RESERVATION USE SETTING | SECOND PRIORITY |
| 4 | ADJACENT WEAK RESERVATION USE | — |
| 3 | PRIORITY USE SETTING | THIRD PRIORITY |
| 2 | ADJACENT PRIORITY USE | — |
| 1 | OPERATION SLOT WITHOUT RESERVATION | — |
| 0 | DORMANT SLOT | — |

FIG. 9

| VALUE OF THIS SIDE / VALUE OF OPPONENT | 1 (PAPER) | 2 (SCISSORS) | 3 (ROCK) |
|---|---|---|---|
| 1 (PAPER) | DRAW | THIS SIDE WON | THIS SIDE LOST |
| 2 (SCISSOR) | THIS SIDE LOST | DRAW | THIS SIDE WON |
| 3 (ROCK) | THIS SIDE WON | THIS SIDE LOST | DRAW |

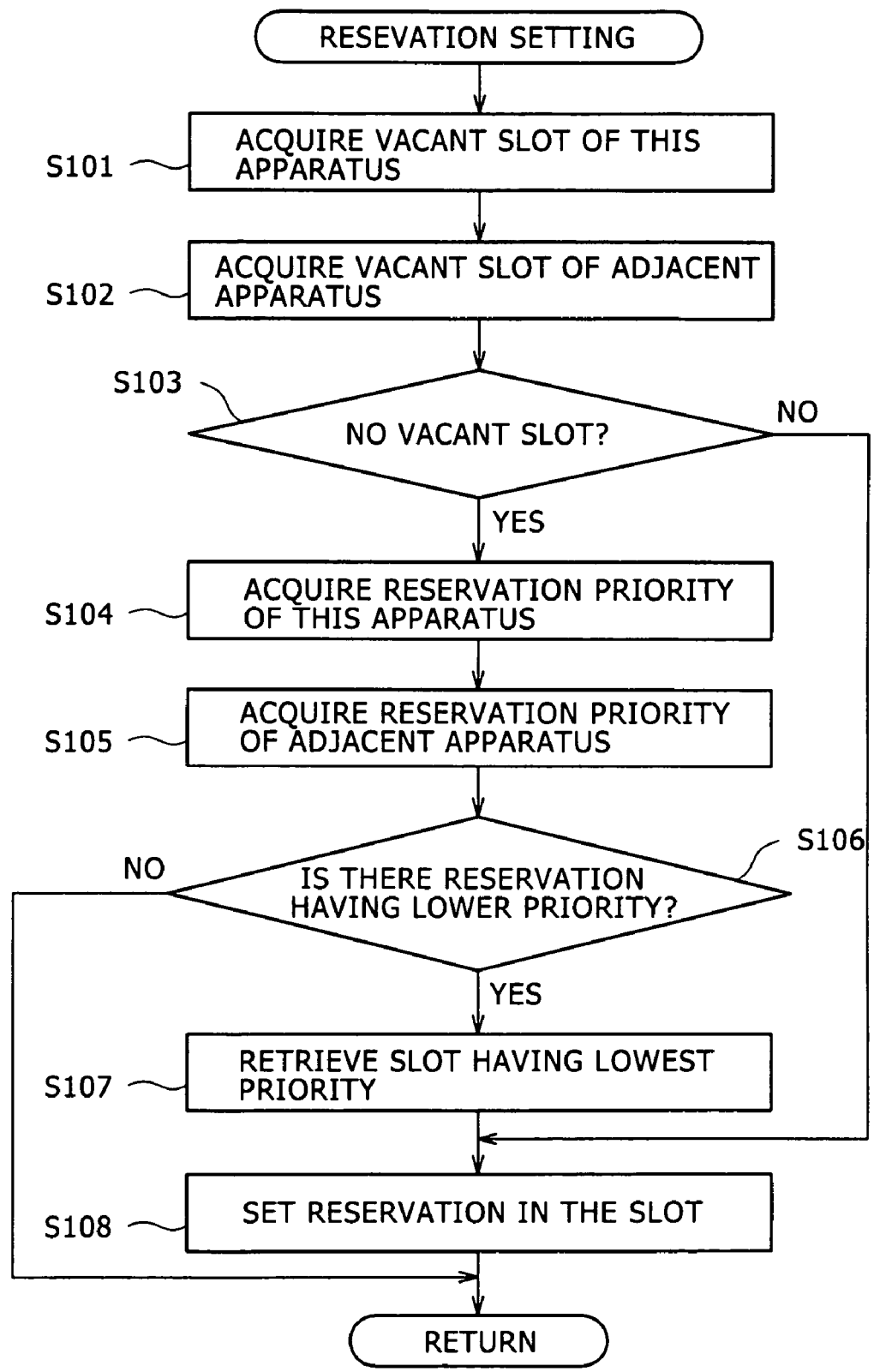

WIRELESS COMMUNICATION SYSTEM, WIRELESS COMMUNICATION APPARATUS, WIRELESS COMMUNICATION METHOD, AND COMPUTER PROGRAM

CROSS REFERENCES TO RELATED APPLICATIONS

The present invention contains subject matter related to Japanese Patent Application 2004-171860 filed in the Japanese Patent Office on Jun. 9, 2004, the entire contents of which being incorporated herein by reference.

BACKGROUND OF THE INVENTION

1. Field of the Invention

The present invention relates to a wireless communication system, a wireless communication apparatus, a wireless communication method, and a computer program such as a wireless LAN (Local Area Network) for communicating between a plurality of wireless stations. In particular, the present invention concerns a wireless communication system, a wireless communication apparatus, a wireless communication method, and a computer program for managing a network in such a manner that at least part of the communication stations notify a beacon in which information about the network is described.

Further, more specifically, the present invention relates to a wireless communication system, a wireless communication apparatus, a wireless communication method, and a computer program for allowing a communication station to perform data communication in which a band is guaranteed with a band reservation scheme. In particular, the present invention relates to a wireless communication system, a wireless communication apparatus, a wireless communication method, and a computer program for mediating a conflict over a reservation band between communication stations with low-load processing and avoiding the conflict of reservation use.

2. Description of the Related Art

Computer networking including a LAN can efficiently realize the sharing of information resources and the sharing of equipment resources. Nowadays, attention is being given to a wireless LAN as a system that frees users from cabling of conventional wired LANs. The wireless LAN can eliminate most of cables from workspaces such as offices. Accordingly, it is possible to relatively easily move communication terminals such as personal computers (PCs).

In recent years, there is remarkably increasing demand for wireless LAN systems as they achieve higher speeds and become available at reduced costs. Particularly, introduction of a personal area network (PAN) is being considered to construct small-scale networks for information communication between electronic devices available around users. For example, some different wireless communication systems and wireless communication apparatuses have been standardized by utilizing such frequency bands as 2.4 GHz and 5 GHz which require no license from an administrative government office.

Canonical standards concerning wireless networks can include IEEE (The Institute of Electrical and Electronics Engineers) 802.11 (e.g., see non-patent document 1), HiperLAN/2 (e.g., see non-patent document 2 or 3), IEEE802.15.3, and Bluetooth communication, for example. The IEEE802.11 has enhanced standards such as IEEE802.11a (e.g., see non-patent document 4), b, and g depending on differences of wireless communication systems and frequency bands.

Further, a so-called "ultra-wideband (UWB) communication" for carrying out the wireless communications by putting information on very weak impulse series is attracting attention as a short range, ultra-high speed wireless communication system, and this system is expected to be made practicable. An access control system of ultra-wideband (UWB) communication is now under review in IEEE802.15.3 and the like.

According to a general method of constructing a local area network using the wireless technology, there is provided one apparatus called an "access point" or a "coordinator" functioning as a control station inside the area. The network is formed under overall control of the control station. For this kind of wireless network there is broadly used an access control method based on the band reservation, in which communication apparatuses synchronize with each other through the mediation of the access point. In other words, when a given communication apparatus transmits information, a band needed for the information transmission is firstly reserved through the access point so that the communication apparatus can use a transmission path without conflict with information transmission by another communication apparatus.

On the other hand, there arises a problem to significantly decrease efficiency of using the transmission path in the case of performing asynchronous communication between transmitting and receiving communication apparatuses in the wireless communication system having the access point because it is absolutely necessary to perform wireless communication through the access point. For this reason, as another method of constructing a wireless network, there is proposed a so-called "ad-hoc communication" for directly performing asynchronous communication between communication stations operating autonomously. Particularly, in a small-scale wireless network composed of a relatively small number of clients that locate close to each other, it is considered that such ad-hoc communication is suitable because any terminal can directly perform asynchronous wireless communication without using a particular access point.

An ad-hoc wireless communication system has no central control station. Accordingly, this system is suited for constructing a home network composed of household electric appliances. The ad-hoc network has several features. For example, if one apparatus fails or is powered off, the routing is automatically changed, making the network strong against crash. Since a packet is hopped more than once between mobile stations, data can be transferred to a relatively distant destination with a high data rate maintained. There are known various development examples about the ad-hoc system (e.g., see non-patent document 5).

In the case of transmitting real-time, namely, consecutive data such as AV contents which need to be sent at evenly spaced time intervals, it is necessary to guarantee the band.

In conventional band reservation communication, the above-mentioned wireless communication system managed under the control of the control station is typically employed, and the control station reserves a band in response to a band use request from each terminal station.

For example, according to the standard of a wireless personal area network (WPAN) in IEEE 802.15.3, there is defined time-division multiplexing in which a control station called a coordinator assigns a necessary communication band as a guaranteed time slot (GTS) in response to a request from a communication apparatus as a terminal station. In this case, the control station can perform the centralized management of bands to be used, so that a communication apparatus as a terminal can transmit without conflict with transmission by another communication apparatus. Further, there is proposed a method that, in the case where a conflict over a use band occurs between communication apparatuses belonging to different networks, communication apparatuses that have detected the conflict report the situation to their respective control stations, which then assign different bands to the communication apparatuses.

[Non-patent document 1] International Standard ISO/IEC 8802-11:1999(E) ANSI/IEEE Std 802.11, 1999 Edition, Part11:Wireless LAN Medium Access Control (MAC) and Physical Layer (PHY) Specifications

[Non-patent document 2] ETSI Standard ETSI TS 101 761-1 V1.3.1 Broadband Radio Access Networks (BRAN); HIPERLAN Type 2; Data Link Control (DLC) Layer; Part1: Basic Data Transport Functions

[Non-patent document 3] ETSI TS 101 761-2 V1.3.1 Broadband Radio Access Networks (BRAN); HIPERLAN Type 2; Data Link Control (DLC) Layer; Part2: Radio Link Control (RLC) sublayer

[Non-patent document 4] Supplement to IEEE Standard for Information technology-Telecommunications and information exchange between systems-Local and metropolitan area networks-Specific requirements-Part 11: Wireless LAN Medium Access Control (MAC) and Physical Layer (PHY) specifications: High-speed Physical Layer in the 5 GHZ Band

[Non-patent document 5] C. K. Tho, "Ad Hoc Mobile Wireless Network" (Prentice Hall PTR)

SUMMARY OF THE INVENTION

In a network managed under a control station, there is no overlap in communication coverage between control stations in adjacent networks; however, a communication station may spatially coexist with another communication station in another network.

As described above, in a network under a control station, the control station assigns reservation use bands to each communication station in such a way that there occurs no conflict in the network. Therefore, there is no interference between control stations in adjacent networks; however, there may be a conflict of the use band between the spatially coexisting communication stations. In this case, there is a problem that communication stations cannot perform information transmission that corresponds to the band assigned in the network.

Particularly, in a communication apparatus in a personal area network, as users move physically, there is a higher possibility of overlap of the use band with a communication station in another network, so that this problem becomes more pronounced.

Thus, in the case where there is overlap (i.e., conflict) of the use band with a communication station in another network, a communication station requests the control station to change the assignment of the use band, thereby resolving the conflict. However, in the case where the competing communication stations request the respective control stations in their respective networks to change the assignment of the use band, the processing operation is redundant and there is a possibility that another conflict occurs at a band newly assigned when both sides change their bands.

That is, if the control stations do not yield a use band between themselves, there may be another conflict at a newly assigned area.

On the other hand, in an ad-hoc network in which communication stations operate in a mutually autonomous distributed manner, arbitrary communication stations can constitute a network, and there exists no procedure that communication stations request the control station to assign bands, so that a procedure of changing a reservation use band at the time of a conflict is simple.

However, in the case where information transmission is performed guaranteeing the band in isochronous communication or the like, although a reservation use band needs to be set excluding communication between other communication stations, the centralized management of use bands cannot be performed due to lack of the control station in the ad-hoc network. Therefore, it is very difficult to realize communication that requires band reservations.

Further, in the case where there is a conflict over a reservation use band between communication stations in the ad-hoc network as well, there cannot be excluded a risk of another conflict after both communication stations change the settings of the use bands.

The present invention has been made in view of the above-described technical problems, and it is desirable to provide a wireless communication system, a wireless communication apparatus, a wireless communication method, and a computer program for allowing a communication station to appropriately perform data communication in which a band is guaranteed with a band reservation scheme.

It is also desirable to provide a wireless communication system, a wireless communication apparatus, a wireless communication method, and a computer program for mediating a conflict over a reservation band between communication stations with low-load processing and appropriately avoid the conflict of reservation use.

According to a first embodiment of the present invention, there is provided a wireless communication system in which communication apparatuses perform band reservation use. A plurality of reservation types that have different priorities being defined for a band reservation, in the case where there occurs a conflict of band reservation use between two or more communication apparatuses, the wireless communication system includes the steps of comparing priorities between the communication apparatuses, continuing reservation use of a communication apparatus that has performed the reservation use having a higher priority, and moving reservation use of a communication apparatus that has performed the reservation use having a lower priority, to another area.

In this context, the term "system" signifies a logical set of a plurality of apparatuses (or function modules to implement a specific function). It is indefinite whether or not the apparatuses or function modules are contained in a single cabinet (the same applies hereinafter).

Further, according to a second embodiment of the present invention, there is provided a wireless communication system in which communication apparatuses perform band reservation use. The wireless communication system includes the steps of notifying between communication apparatuses a beacon signal that includes information about a reservation use band of each communication apparatus and superiority-or-inferiority determination information that is used for superiority-or-inferiority determination if there is a conflict of reservation use, comparing each other's superiority-or-inferiority determination information between communication apparatuses if there occurs a conflict of band reservation use between two or more communication apparatuses, continuing reservation use of a communication apparatus that has performed the reservation use having a higher priority, and moving reservation use of a communication apparatus that has performed the reservation use having a lower priority, to another area.

As processing of the superiority-or-inferiority determination described above, control by rock-paper-scissors can be employed for example. That is, each communication apparatus creates a rock-paper-scissors value as superiority-or-inferiority determination information and describes it in a beacon. If there is a conflict of reservation use with another communication apparatus at a band, the communication apparatus compares its rock-paper-scissors value with that of the competing communication apparatus, determines the priority based on an outcome of comparing rock-paper-scissors values, and determines whether or not to move its reservation use.

In communication systems, there performed random access communication for allowing each communication station having transmission data to acquire a transmission right based on carrier detection of a transmission path, reserved communication for performing data transmission previously reserving a band to be used, and the like. For example, in the case of transmitting real-time, namely, consecutive data such as AV contents which need to be sent at evenly spaced time intervals, it is necessary to guarantee the band by reservation use or priority use of the band.

It is common to realize band reservation communication by performing the centralized management of bands under a control station. However, there is no interference between control stations in adjacent networks; however, there may be a conflict of the use band between the spatially coexisting communication stations. In this case, communication stations cannot perform information transmission that corresponds to the band assigned in the network. This problem becomes more pronounced in a personal area network where users move frequently.

On the other hand, in a wireless communication system according to the present invention, there are provided a plurality of reservation types according to priority of communication, and by introducing a scheme for determining the relative superiority between communication stations without leaning to one side, the competing communication stations can directly determine between themselves which communication station should change its reservation use area. Therefore, when there is a conflict over a reserved band between communication stations, the mediation can be performed with low-load processing, so that the management of the whole system becomes more efficient.

In a wireless communication system according to the present invention, communication apparatuses notify beacons to each other, so that the network is managed in an autonomous distributed manner. In this system, reservation use of bands is permitted, and there are provided a plurality of reservation types according to priority of communication. Further, a communication station that performs reservation use describes a reservation type thereof in a beacon. Furthermore, at the time of transmitting the beacon, the communication station selects a rock-paper-scissors value and describes it in the beacon.

In the case where a conflict of reservation use occurs at some area, the communication stations refer to their beacons between themselves to compare their reservation types, in the first place. A communication station that has performed the reservation use of a higher priority continues the reservation use, but a communication station that has performed the reservation use of a lower priority moves the reservation use to another area. The communication station that is to move the reservation use moves the reservation use to a vacancy area or tries to move the reservation use to an area where the priority of the communication station is superior to that of a different communication station that has performed the reservation use on the area.

Thus, since only one communication station changes the reservation use area in the case where there is a conflict of reservation use, there is no risk that both communication stations change the settings of the use bands and then another conflict occurs. Further, the conflict can be resolved directly between the competing communication stations with low-load processing.

Further, in the case where there is a conflict of reservation use between the communication stations and there is no superiority or inferiority in both priorities as a result of comparing their reservation types between themselves, the relative superiority, namely, the priority is determined between the communication stations with another procedure. A communication station that has performed the reservation use of a higher priority continues the reservation use, but a communication station that has performed the reservation use of a lower priority moves the reservation use to another area. More specifically, the communication stations perform control by rock-paper-scissors based on the beacon descriptions, and the communication station that has lost by the judgment changes its reservation use area.

According to the control by rock-paper-scissors, since only one communication station changes the reservation use area in the case where there is a conflict of reservation use, there is no risk that both communication stations change the settings of the use bands and then another conflict occurs. Further, the conflict can be resolved directly between the competing communication stations with low-load processing.

Further, according to a third embodiment of the present invention, there is provided a computer program described in computer-readable form so as to execute, on a computer system, processing for performing data transmission by band reservation under a wireless communication environment in which a plurality of reservation types that have different priorities are defined. The computer program includes a beacon notification step of creating and notifying a beacon signal that includes information about a reservation use band of a wireless communication apparatus and a reservation type thereof, a beacon analysis step of analyzing a beacon signal received from an adjacent communication apparatus, and a usable-band setting step of setting a usable band based on a reservation use band set by the wireless communication apparatus and a result of analyzing the beacon signal.

Furthermore, according to a fourth embodiment of the present invention, there is provided a computer program described in computer-readable form so as to execute, on a computer system, processing for performing data transmission by band reservation. The wireless communication method includes a superiority-or-inferiority determination information creating step of creating superiority-or-inferiority determination information used for superiority-or-inferiority determination if there is a conflict of reservation use, a beacon notification step of creating and notifying a beacon signal that includes information about a reservation use band of a wireless communication apparatus and superiority-or-inferiority determination information, a beacon analysis step of analyzing a beacon signal received from an adjacent communication apparatus, and a usable-band setting step of setting a usable band based on a reservation use band set by the wireless communication apparatus, the superiority-or-inferiority determination information, and a result of analyzing the beacon signal.

The computer program according to the third and fourth embodiments of the present invention is defined as a computer program described in a computer-readable form so as to implement specified processes on a computer system. In other words, when the computer program according to the third and fourth embodiments of the present invention is installed in a computer system, the computer system exhibits cooperative effects and operates as a wireless communication apparatus. A plurality of such wireless communication apparatuses can be activated to construct a wireless network. In this manner, it is possible to provide effects similar to those of the wireless communication system according to the first and second embodiment of the present invention.

According to the embodiments of the present invention, there are provided a wireless communication system, a wireless communication apparatus, a wireless communication method, and a computer program for allowing a communication station to appropriately perform data communication in which a band is guaranteed with a band reservation scheme.

According to the embodiments of the invention, there are provided a wireless communication system, a wireless communication apparatus, a wireless communication method, and a computer program for mediating a conflict over a reservation band between communication stations with low-load processing and appropriately avoid the conflict of reservation use.

According to the embodiments of the invention, in the case where there is a conflict of reservation use between the adjacent communication apparatuses, the communication apparatuses can determine which communication apparatus should change its reservation use band with low-load processing based on their reservation use priorities. At this time, in the case of the same reservation use priority, the communication apparatuses can determine which communication apparatus should change its reservation use band with low-load processing by performing the superiority-or-inferiority determination using the control by rock-paper-scissors.

According to the embodiments of the invention, in the case of detecting reservation use conflicting with another communication apparatus, by defining the conditions for changing either one of the reservations, there is obtained a method by which both apparatuses coexist with reliability compared to the changes by both apparatuses. Thus, if the priority of the communication apparatus is superior to that of the other communication apparatus, the communication apparatus continues the reservation of the slot. In this manner, both communication apparatuses do not set slots again at the same time so that a risk of another conflict of use slots after resetting can be effectively excluded.

According to the embodiments of the invention, communication apparatuses specify in beacons reservation use types whose priorities are defined according to the types, thereby identifying a communication apparatus that changes its reservation use according to the priority in the case of detecting a conflict of reservation use.

According to the embodiments of the invention, in the case of the same priority setting between the adjacent communication apparatuses, either one of the reservations can be surely set again by comparing specified superiority-or-inferiority determination information (rock-paper-scissors values). That is, in the case of reservation use of the same priority, a communication apparatus that has lost changes its reservation use, thereby providing a method for fairly using a reservation use band.

Further, a communication apparatus describes specified superiority-or-inferiority determination information (rock-paper-scissors value) in a beacon for notification in advance, thereby determining the relative superiority immediately in the case of a conflict of reservation use of the same priority. Further, in the case of employing a rock-paper-scissors value as the specified superiority-or-inferiority determination information, the relative superiority can be determined fairly according to the setting status.

These and other features and advantages of the invention may be readily ascertained by referring to the following description of the embodiment and appended drawings.

BRIEF DESCRIPTION OF THE DRAWINGS

FIG. 3 schematically shows an internal structure of each superframe managed by each communication station in an autonomous distributed wireless network.

FIG. 4 shows an exemplary internal structure of a beacon time slot.

FIG. 5 shows a structure example of a beacon frame.

FIG. 6 shows a list of slot types described in a slot structure field in a beacon frame.

FIG. 9 shows a relationship between set values of rock-paper-scissors and comparison results thereof, for determining the relative superiority for a reserved slot.

FIG. 18 is a flowchart showing the operation process for acquiring the slot use status and setting reservation use in steps S24 and S25 shown in FIG. 17.

DESCRIPTION OF THE PREFERRED EMBODIMENTS

An embodiment of the present invention will be described below in detail with reference to the accompanying drawings.

A transmission path for communications currently assumed in the present invention is wireless, and a network is built among a plurality of communication stations. A wireless network system according to the present invention has an autonomous distributed system configuration where a control station is not disposed, and uses the transfer (MAC) frame having a moderate time division multiple access structure to provide transfer control by effectively using channel resources. Further, communication stations can transfer information directly and asynchronously following an access procedure based on CSMA (Carrier Sense Multiple Access).

In an embodiment of the present invention to be described below, for example, an ultra-wideband communication method for carrying out wireless communications by putting information on very weak impulse series can be employed. An access control system of ultra-wideband communication is now under review in IEEE802.15.3 and the like. However, the gist of the present invention is not limited to this.

Processes in each communication station to be described below are basically performed in all communication stations entering the network. Depending on cases, however, all communication stations constituting the network do not perform the processes to be described below.

Figure 1:
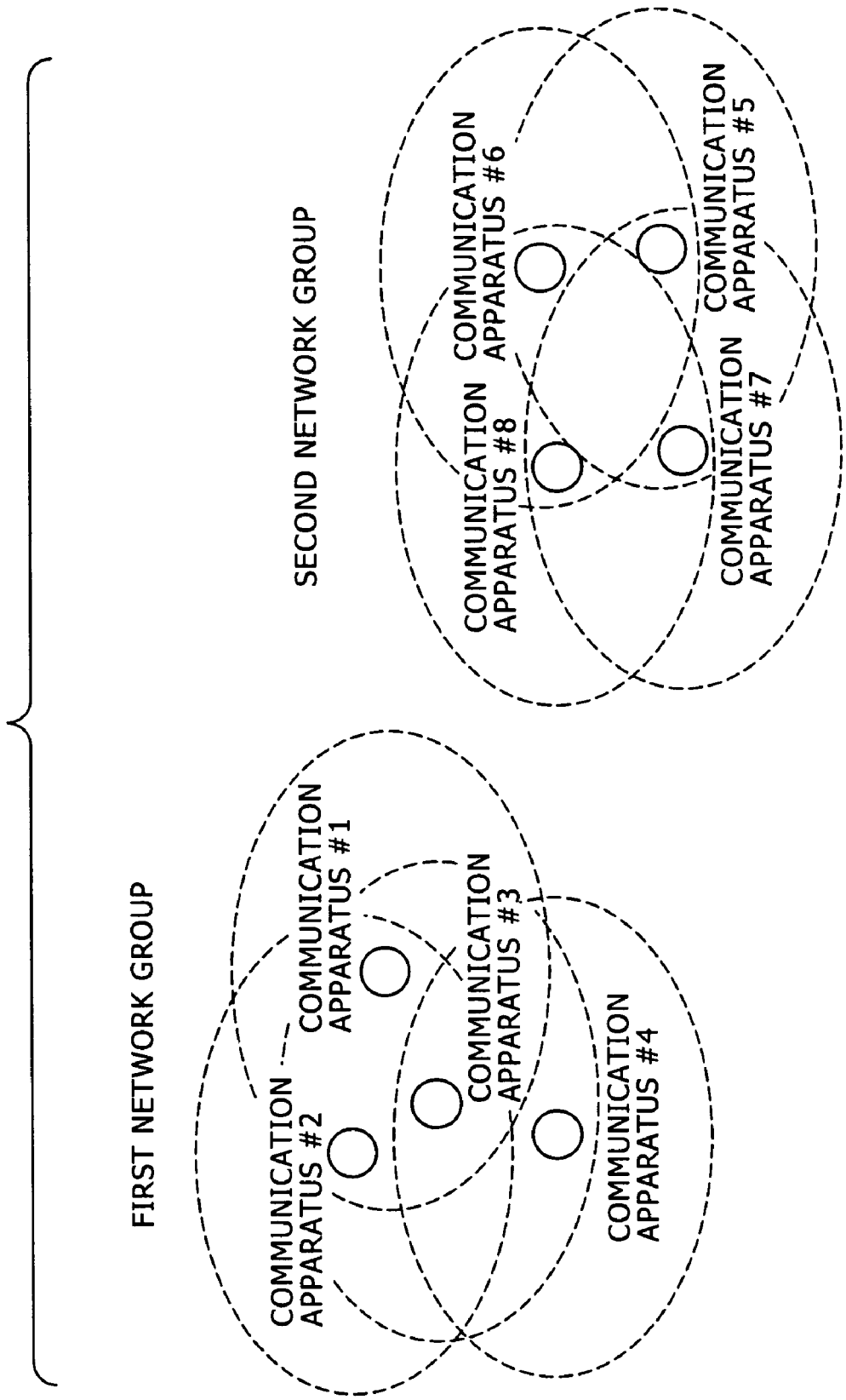
FIG. 1 shows a disposition example of communication apparatuses constituting a wireless communication system.

FIG. 1 shows a disposition example of communication apparatuses constituting a wireless communication system. FIG. 1 illustrates that communication apparatuses #1 through #8 are distributed in the same space. In the wireless communication system shown in FIG. 1, each communication apparatus operates in an autonomous distributed manner without a control station, and an ad-hoc network is formed.

In the example shown in FIG. 1, communication apparatuses #1 through#4 that can carry out direct communications constitute a first network group. Communication apparatuses #5 through #8 constitute a second network group.

The communication apparatus #1 in the network group 1 can directly communicate with the adjacent communication apparatuses #2 and #3 within the coverage of the radio wave (within the ellipse indicated by dashed lines centering on #1), but cannot directly communicate with the communication apparatus #4 beyond the coverage.

Further, the communication apparatus #2 can directly communicate with the adjacent communication apparatuses #1 and #3, but cannot directly communicate with the communication apparatus #4.

The communication apparatus #3 can directly communicate with the adjacent communication apparatuses #1, #2, and #4.

The communication apparatus #4 can directly communicate with the adjacent communication apparatus #3, but cannot directly communicate with the communication apparatuses #1 and #2.

Furthermore, the communication apparatus #5 in the network group 2 can directly communicate with the adjacent communication apparatuses #6 and #7, but cannot directly communicate with the communication apparatus #8.

The communication apparatus #6 can directly communicate with the adjacent communication apparatuses #5 and #8, but cannot directly communicate with the communication apparatus #7.

The communication apparatus #7 can directly communicate with the adjacent communication apparatuses #5 and #8, but cannot directly communicate with the communication apparatus #6.

The communication apparatus #8 can directly communicate with the adjacent communication apparatuses #6 and #7, but cannot directly communicate with the communication apparatus #5.

Figure 2:
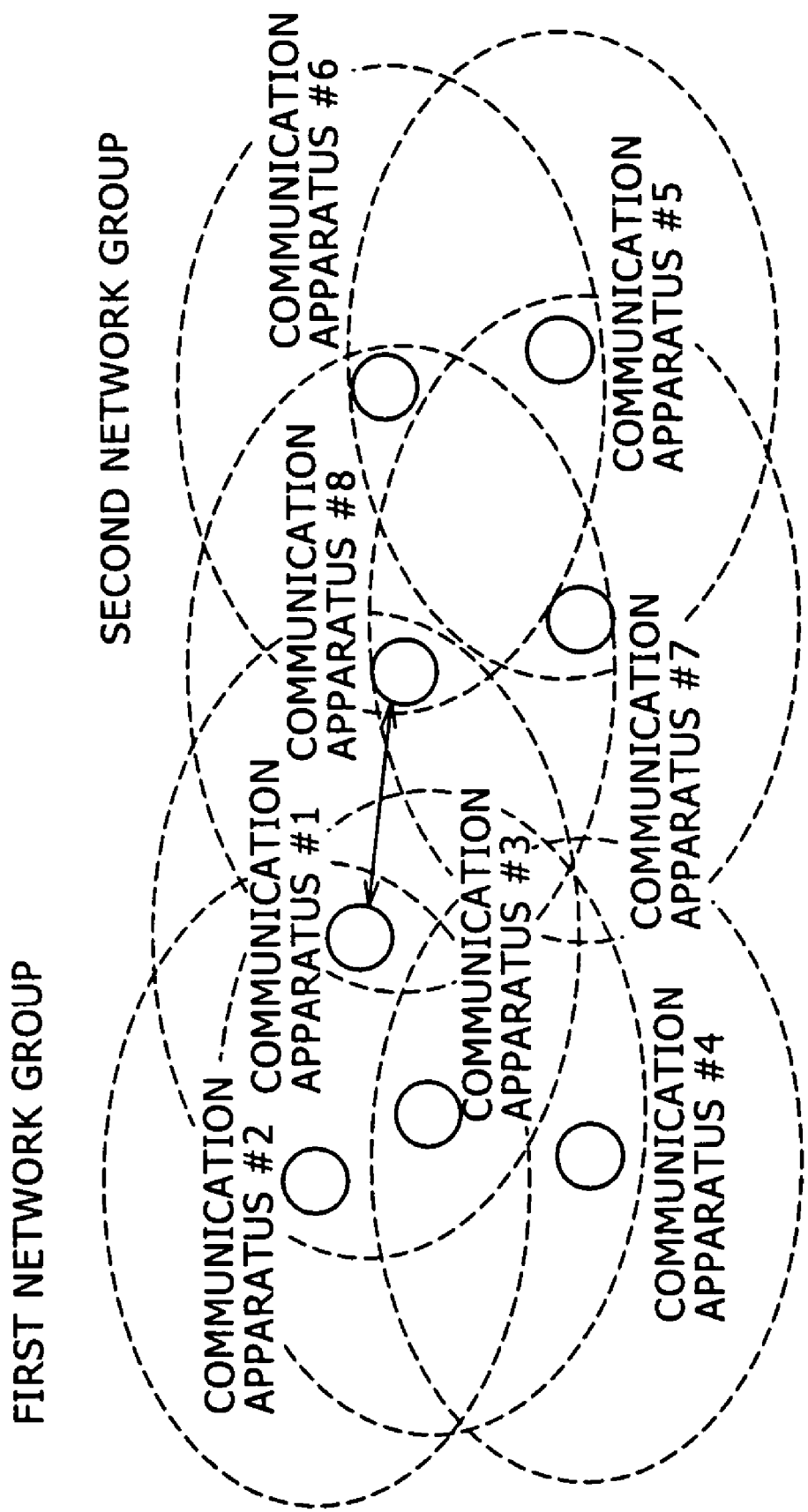
FIG. 2 shows another example of the disposition of communication apparatuses constituting a wireless communication system.

FIG. 2 shows another example of the disposition of communication apparatuses constituting a wireless communication system.

In the example shown in FIG. 1, since there is enough space between the first network group and the second network group, each communication apparatus in each network group does not detect the existence of a communication apparatus belonging to the other network group. On the other hand, in the example shown in FIG. 2, as a network moves or a physical barrier blocking the communication between the networks is eliminated, the first network group and the second network group come to be in adjacent existence. Thus, a communication apparatus in a network group can detect the existence of a communication apparatus belonging to the other network group.

That is, in FIG. 2, the communication apparatus #1 in the network group 1 is adjacent to the communication apparatus #8 in the network group 2, and communications between different network groups need to be mediated.

In the example shown in FIG. 2, due to the move of the network, the communication apparatus #1 and the communication apparatus #8 enter each other's communication coverage. Therefore, in the case where a time slot that the communication apparatus #1 uses for communication coincides with a time slot that the communication apparatus #8 uses for communication (i.e., a conflict occurs), a time slot used in either of the two communication apparatuses needs to be moved (changed), otherwise communications cannot be established.

In the conventional wireless communication system for performing the centralized management of bands under a control station, communication apparatuses need to request the control station to change a band, and the communication apparatuses that have came into conflict with each other cannot directly perform a procedure for resolving the conflict. On the other hand, in a wireless communication system according to the present invention, as described in detail, there are provided a plurality of reservation types according to priority of communication, and by introducing a scheme for determining the relative superiority between communication apparatuses without leaning to one side, communication apparatuses can directly determine between themselves which communication apparatus should change its reserved time slot.

In a wireless communication system according to this embodiment, each communication apparatus operates in an autonomous distributed manner without a communication apparatus as a control station. In order to operate the autonomous distributed network, at least part of the communication apparatuses notify beacon information on channels, thereby letting other communication apparatuses in the neighborhood (i.e., within the communication coverage) know the existence of themselves and notifying the network configuration. Further, communication apparatuses that perform band reservation use describe reservation types and rock-paper-scissors values as information for determining the relative superiority of the reservation, in beacon information, but this will be described later.

In an autonomous distributed network according to this embodiment, each communication apparatus transmits beacons at intervals of a frame called a "superframe". FIG. 3 schematically shows an internal structure of each superframe managed by each communication station. In communication apparatuses, their respective superframes are defined by beacon transmission.

A superframe period is defined by the slot start position where communication apparatuses transmit their respective beacons. Further, timing of information transmission is managed as time slots that a superframe further subdevided into with reference to this beacon transmission timing. In the example shown in FIG. 3, a superframe is divided into 256 equal parts, and there are provided 256 relative positions (i.e., slots) that are 0 to 255.

The time slot (time slot 0) at the beginning of the superframe is configured such that a beacon is transmitted in the network group and is hereinafter referred to as a "beacon time slot" as well. The subsequent time slots (1 to 255) are used as necessary in the case of performing data communications.

Each communication apparatus within a wireless network finds a beacon signal transmitted from an adjacent communication apparatus by scanning channels during only the period of the beacon time slot, and knows the network configuration by decrypting information described in the beacon.

FIG. 4 shows an exemplary internal structure of a beacon time slot.

The beacon time slot is established as an area where each communication apparatus mutually transmits and receives a beacon signal in a network group. In order to avoid a conflict between the respective transmitting beacons, each communication apparatus for transmitting a beacon sets offsets for adjustment in beacon transmission timing to be used.

According to this embodiment, 8 beacon transmission offsets (BS0 to BS7) are prepared in a beacon time slot, and there are defined offsets used by each communication apparatus as necessary. In the example shown in FIG. 4, the communication apparatus #1 in the first network group transmits a beacon at BS0, the communication apparatus #2 transmits a beacon at BS4, the communication apparatus #3 transmits a beacon at BS2, and the communication apparatus #4 transmits a beacon at BS6.

Further, in each of the communication apparatuses #5 to #8 in the second network group that do not belong to the first network group, there is independently defined a beacon time slot that differs from the above-mentioned beacon time slot. In the second network group as well, beacon transmission offsets are set in each communication apparatus.

Alternatively, communication apparatuses constituting a network group may be provided with each individual time slot. In this case, communication apparatuses in the network group have each individual superframe period, and each superframe is defined with reference to the beacon time slot of each station. If it is noted that the communication apparatuses have each individual time-slot number, it is possible to grasp time-slot structure of another communication apparatus even within one network group.

As already described, in an autonomous distributed wireless communication system according to this embodiment, each communication apparatus notifies beacon information on channels, thereby letting other communication apparatuses in the neighborhood (i.e., within the communication coverage) know the existence of itself and notifying the network configuration. FIG. 5 shows a structure example of a beacon frame.

As shown in FIG. 5, the beacon frame includes a Type field, a Length field, an Rx Address field, a Tx Address field, and an HCS field, as a header section. Further, the beacon frame includes a Group ID field, a Slot Structure field, a Rock-Paper-Scissors Value field, an Attribute field, and a FCS field, as a beacon payload.

In the Type field, there is described an identifier which indicates that the frame is a beacon signal. Further, in the Length field, there is described information length of the frame.

In the Rx Address field, there is specified a broadcast address to identify a communication apparatus for receiving the frame. Further, in the Tx Address field, there is specified a MAC address of a communication apparatus for transmitting the frame. Furthermore, in the HCS (Head Check Sequence) field, there is described information for detecting an error in the header section.

In the Group ID field, there is described a Group ID for identifying a network group containing the communication apparatus concerned. Further, in the Slot Structure field, there is described information for notifying a slot use status in its own superframe. In the Slot Structure field, there are described individual use statuses of 256 slots with reference to its own beacon position.

In the Rock-Paper-Scissors Value field, there are described rock-paper-scissors values which are set in order to determine the relative superiority of the reservation with rock-paper-scissors in the case where there is a conflict of reservation use and the priorities of the reservations are the same.

In the Attribute field, there is described operating capability and an attribute of the communication apparatus. Further, a time slot number used for a beacon time slot may be described in the Attribute field.

Lastly, there is added a FCS for detecting an error in the whole of the beacon frame.

In the wireless communication system according to this embodiment, each communication apparatus can set reservation use in units of time slots of a superframe. At the time of reserving a time slot, since a plurality of reservation types are defined according to priority of communication, the competing communication apparatuses can directly determine between themselves which communication apparatus should move its reservation use according to the priority of the reservation use when there occurs a conflict of reserving the same time slot.

The communication apparatus sets reservation use status for each of the time slots in a superframe, describes the set values to the Slot Structure field in a beacon frame, and notifies the adjacent communication apparatuses of the set values.

In the wireless communication system according to this embodiment, a communication apparatus can make reservation use in units of time slots. Further, there are defined a plurality of reservation types having different priorities, and there is a scheme in which communication apparatuses can autonomously determine which reservation use to take, referring to each other's reservation types between the competing communication apparatuses when there is a conflict of reservation use.

Further, in accordance with reservation types set to a time slot that a communication apparatus reserves and reservation types set to a time slot that an adjacent communication station reserves, a plurality of reservation types are defined in a time slot. A communication apparatus describes each time-slot type to a Slot Structure field in a beacon frame and notifies the adjacent communication apparatuses of the described data.

FIG. 6 shows a list of time-slot types described in a Slot Structure field in a beacon frame. For convenience of explanation, description will be made on examples of slots based on 8 different "status values" (0 to 7) as time-slot types; however, the gist of the present invention is not limited to this. Uses other than shown in FIG. 6 or subdivisions of uses shown in FIG. 6 may be prepared as necessary.

A status value 7 indicates a strong reservation slot. Communication apparatuses around a communication apparatus having this status value cannot set their reservations etc. and refrain from their use across the whole area of the time slot in order not to interfere with the reserved transmission or reception of the communication apparatus. Further, when a communication apparatus detects that an adjacent communication apparatus shows this setting, the communication apparatus sets its use status of the time slot as an adjacent-strong-reservation slot (status value 6).

A status value 6 indicates an adjacent-strong-reservation slot. Communication apparatuses around a communication apparatus having this status value can set their reservations etc. but refrain from their use across the whole area of the time slot in order not to interfere with the reserved transmission or reception of a communication apparatus adjacent to the communication apparatus with this status value. Further, even when a communication apparatus detects that an adjacent communication apparatus shows this setting, the communication apparatus does not need to change its use status of the time slot.

A status value 5 indicates a weak reservation slot. Communication apparatuses around a communication apparatus having this status value cannot set their reservations etc. and refrain from their transmission until a predetermined time elapses in order not to interfere with the reserved transmission or reception of the communication apparatus. Further, when a communication apparatus detects that an adjacent communication apparatus shows this setting, the communication apparatus sets its use status of the time slot as an adjacent-weak-reservation slot (status value 4).

A status value 4 indicates an adjacent-weak-reservation slot. Communication apparatuses around a communication apparatus having this status value can set their reservations etc. but refrain from their transmission until a predetermined time elapses in order not to interfere with the reserved transmission or reception of a communication apparatus adjacent to the communication apparatus with this status value. Further, even when a communication apparatus detects that an adjacent communication apparatus shows this setting, the communication apparatus does not need to change its use status of the time slot.

A status value 3 indicates a priority use slot. Communication apparatuses around a communication apparatus having this status value can set their reservations etc. but refrain from their transmission until a predetermined time elapses in order that the communication apparatus with this status value preferentially performs transmission. Further, when a communication apparatus detects that an adjacent communication apparatus shows this setting, the communication apparatus sets its use status of the time slot as an adjacent-priority-use slot (status value 2).

A status value 2 indicates an adjacent-priority-use slot. Communication apparatuses around a communication apparatus having this status value can set their reservations etc. but refrain from their transmission until a predetermined time elapses in order that a communication apparatus adjacent to the communication apparatus with this status value performs transmission. Further, even when a communication apparatus detects that an adjacent communication apparatus shows this setting, the communication apparatus does not need to change its use status of the time slot.

A status value 1 indicates a receiving operational state without a reservation. Communication apparatuses around a communication apparatus having this status value can set their reservations etc. and can transmit to the communication apparatus since the communication apparatus indicates a receiving standby state. Further, even when a communication apparatus detects that an adjacent communication apparatus shows this setting, the communication apparatus does not need to change its use status of the time slot.

A status value 0 indicates a dormant state. Communication apparatuses around a communication apparatus having this status value can set their reservations etc. but cannot transmit to the communication apparatus since the communication apparatus is in a dormant state. Further, even when a communication apparatus detects that an adjacent communication apparatus shows this setting, the communication apparatus does not need to change its use status of the time slot.

As shown in FIG. 6, in this embodiment, there are defined 3 reservation types which are a strong reservation, a weak reservation, and priority use. Priorities of the reservation use settings are established in the following order; strong reservation use in the first priority, weak reservation use in the second priority, and priority use in the third priority. In the case where there is a conflict of reservation use over a time slot between a plurality of communication apparatuses, a reservation with a higher priority can continue to be used.

Figure 7:
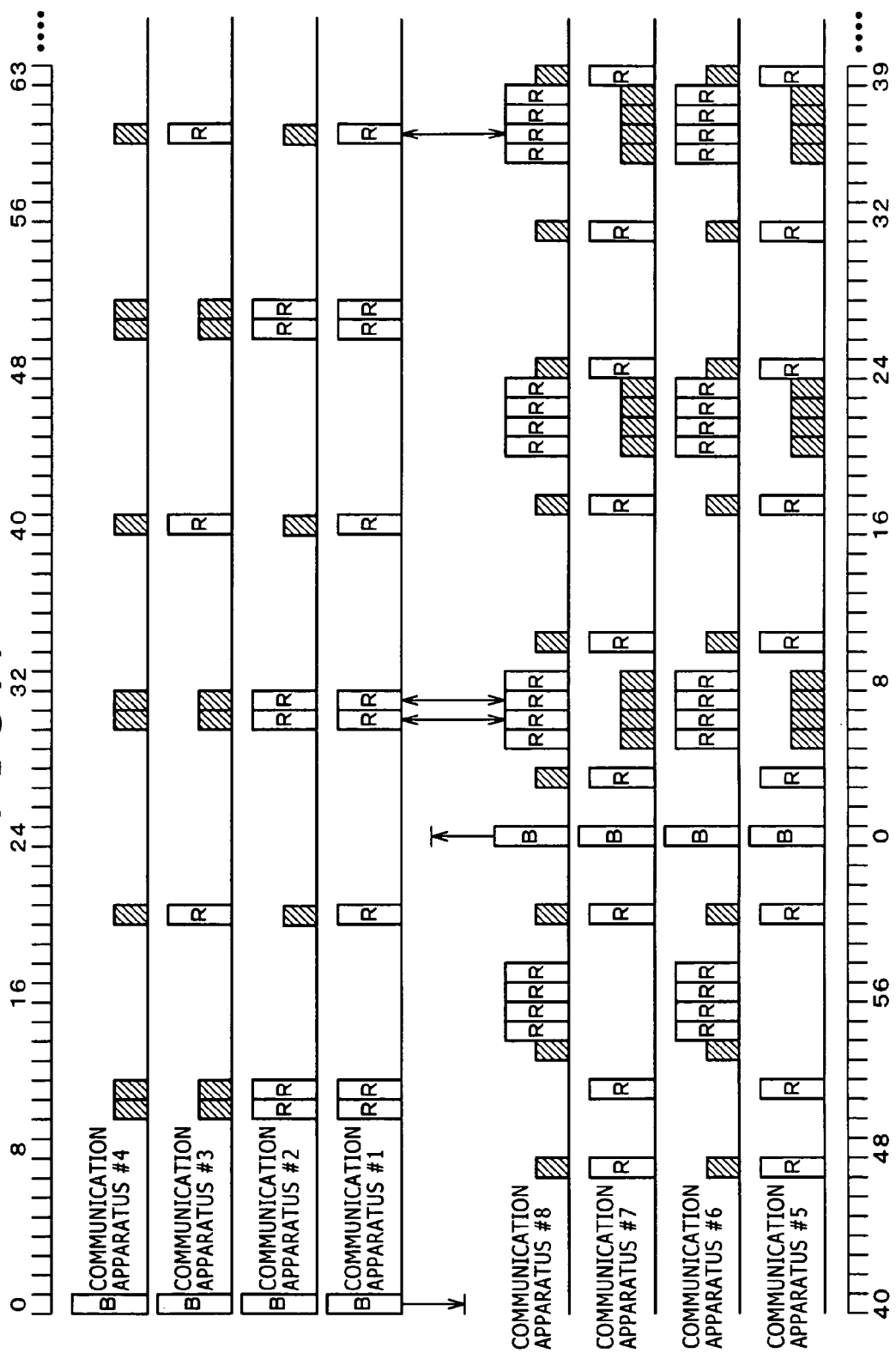
FIG. 7 shows a structure example of using time slots in a superframe period at each communication apparatus in a plurality of ad-hoc networks shown in FIG. 1.

FIG. 7 shows a structure example of using time slots in a superframe period at each communication apparatus in a plurality of ad-hoc networks shown in FIG. 1.

In a state of FIG. 1, communication apparatuses #1 to #4 constitute a first network group, and communication apparatuses #5 to #8 constitute a second network group. Since the first network group and the second network group do not overlap each other and are mutually independent, each communication apparatus can perform reservation use on time slots in each independent group, as described below with reference to FIG. 7.

In FIG. 7, with reference to the time base in time-slot structure used in the first network group in the upper portion, time-slot structure in the second network group is also shown in the lower portion.

A beacon time slot in the first network group corresponds to slot 40 in the second network group. Further, a beacon time slot in the second network group corresponds to slot 24 in the first network group.

In the first network group, the communication apparatus #1 and the communication apparatus #2 communicate with each other reserving time slots 10, 11, 30, 31, 50, and 51, according to the superframe period.

Further, the communication apparatuses #3 and #4 which are adjacent to the communication apparatuses #1 and #2 analyze a beacon signal received from the communication apparatus #1 or the communication apparatus #2, acquire reservation use status in the superframe period, and register these time slots as slots used by an adjacent communication apparatus. In FIG. 7, time slots as described are indicated by diagonally shaded blocks (the same applies hereinafter).

Further, the communication apparatus #1 and the communication apparatus #3 communicate with each other reserving time slots 20, 40, and 60.

Furthermore, the communication apparatuses #2 and #4 which are adjacent to the communication apparatuses #1 and #3 analyze a beacon signal received from the communication apparatus #1 or the communication apparatus #3, acquire reservation use status in the superframe period, and register these time slots as slots used by an adjacent communication apparatus.

In the second network group, the communication apparatus #5 and the communication apparatus #7 communicate with each other reserving time slots 3, 10, 17, 24, 31, 39, 46, 53, and 60, according to the superframe period.

Further, the communication apparatuses #6 and #8 which are adjacent to the communication apparatuses #5 and #7 analyze a beacon signal received from the communication apparatus #5 or the communication apparatus #7, acquire reservation use status in the superframe period, and register these time slots as slots used by an adjacent communication apparatus.

Further, the communication apparatus #6 and the communication apparatus #8 communicate with each other reserving time slots 5, 6, 7, 8, 20, 21, 22, 23, 35, 36, 37, 38, 54, 55, 56 and 57.

Furthermore, the communication apparatuses #5 and #7 which are adjacent to the communication apparatuses #6 and #8 analyze a beacon signal received from the communication apparatus #6 or the communication apparatus #8, acquire reservation use status in the superframe period, and register these time slots as slots used by an adjacent communication apparatus.

Figure 8:
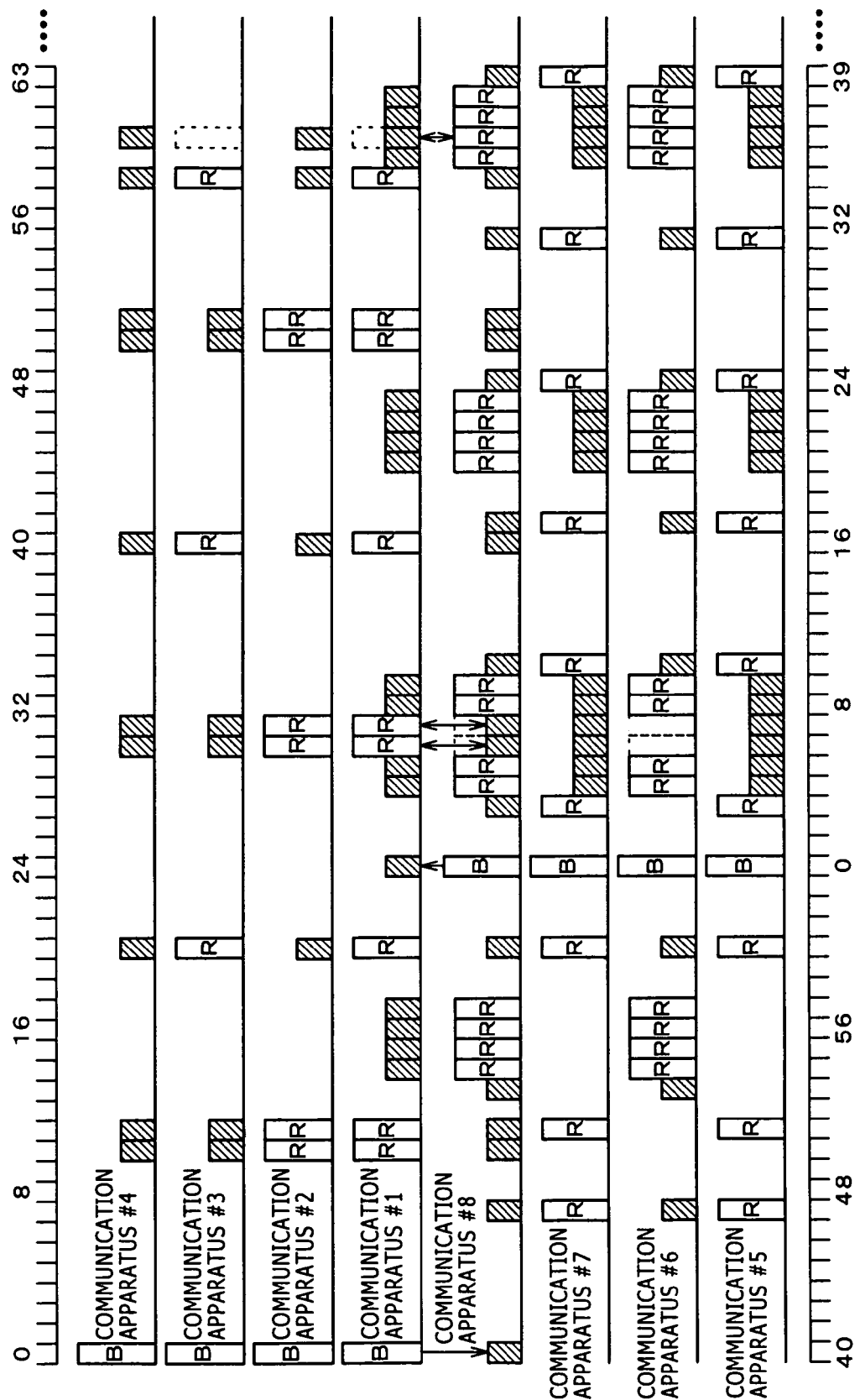
FIG. 8 shows a structure example of using time slots in a superframe period at each communication apparatus in a plurality of ad-hoc networks shown in FIG. 2.

FIG. 8 shows a structure example of using time slots in a superframe period at each communication apparatus in a plurality of ad-hoc networks shown in FIG. 2.

As described above, in a state of FIG. 2, a plurality of ad-hoc networks which are the first network group composed of the communication apparatuses #1 to #4 and the second network group composed of the communication apparatuses #5 to #8 are overlapped due to a change of a communication environment such as the move of a network or the elimination of a physical barrier blocking the communication between the networks. More specifically, the communication apparatuses #1 and #8 recognize each other as an adjacent communication apparatus.

In the examples shown in FIGS. 1 and 7, the first network group and the second network group do not overlap each other and are mutually independent. Further, the communication apparatuses #1 and #8 cannot receive each other's beacon signals; therefore, each communication apparatus cannot grasp time-slot reservation use settings in the other network group. On the other hand, in the examples shown in FIGS. 2 and 8, since the communication apparatuses #1 and #8 can receive each other's beacon signals, each communication apparatus can grasp time-slot reservation use settings in the other network group.

By receiving a beacon of the adjacent communication apparatus #8 at the timing of slot 24, the communication apparatus #1 grasps that the reserved slots 30, 31, and 60 conflict with reservation use of the adjacent communication apparatus #8.

In the same way, by receiving a beacon of the adjacent communication apparatus #8 at the timing of slot 40, the communication apparatus #8 grasps that the reserved slots 6, 7, and 36 conflict with reservation use of the adjacent communication apparatus #1.

The reservations set by the communication apparatus #1 in time slots 30 and 31 have higher priorities than those of the communication apparatus #8; therefore, the communication apparatus #1 continues to use them.

On the other hand, the reservations set by the communication apparatus #8 in time slots 6 and 7 have lower priorities than those of the communication apparatus #1; therefore, the communication apparatus #8 move the reservations to vacant time slots 4 and 9. Further, the communication apparatus #8 sets time slots 6 and 7 at a status value that indicates the presence of a reservation by an adjacent communication apparatus to change the setting of the slot-structure field in the beacon frame.

Further, the reservation set by the communication apparatus #1 in slot 60 has the same priority as that of the communication apparatus #8. In this case, the relative superiority is further determined with a rock-paper-scissors value as described later. As a result of control by rock-paper-scissors, if a value set by the communication apparatus #1 is inferior to that of the communication apparatus #8, the communication apparatus #1 moves the reservation to a vacant time slot 58. Further, the communication apparatus #1 sets the time slot 60 at a status value that indicates the presence of a reservation by an adjacent communication apparatus to change the setting of the slot-structure field in the beacon frame.

Furthermore, even if the reservation set by the communication apparatus #8 in slot 36 has the same priority as that of the communication apparatus #1, the communication apparatus #8 continues to use it if a value set by the communication apparatus #8 is superior to that of the communication apparatus #1 as a result of determining the relative superiority with a rock-paper-scissors value as described later.

FIG. 9 shows a relationship between set values of rock-paper-scissors and comparison results thereof, for determining the relative superiority for a reserved slot. This is used for determining which communication apparatus continues its reservation in the case where the same priority has been set when a conflict of reservations is detected between communication apparatuses adjacent to each other, namely, for controlling it with rock-paper-scissors. Each communication apparatus determines a rock-paper-scissors value and describes this value in the Rock-Paper-Scissors Value field in the beacon frame, for notification.

In this embodiment, value "1" in rock-paper-scissors refers to "paper". Value "2" in rock-paper-scissors refers to "scissors". Value "3" in rock-paper-scissors refers to "rock". Further, the relative superiority is determined in the same way as in a common rock-paper-scissors game.

In the case where a set value of the apparatus is "rock", the rock-paper-scissors is a draw if the opponent shows "rock", the apparatus loses if the opponent shows "scissors", and the apparatus wins if the opponent shows "paper".

In the case where a set value of the apparatus is "scissors", the apparatus loses if the opponent shows "rock", the rock-paper-scissors is a draw if the opponent shows "scissors", and the apparatus wins if the opponent shows "paper".

Further, in the case where a set value of the apparatus is "paper", the apparatus wins if the opponent shows "rock", the apparatus loses if the opponent shows "scissors", and the rock-paper-scissors is a draw if the opponent shows "paper".

Figure 10:
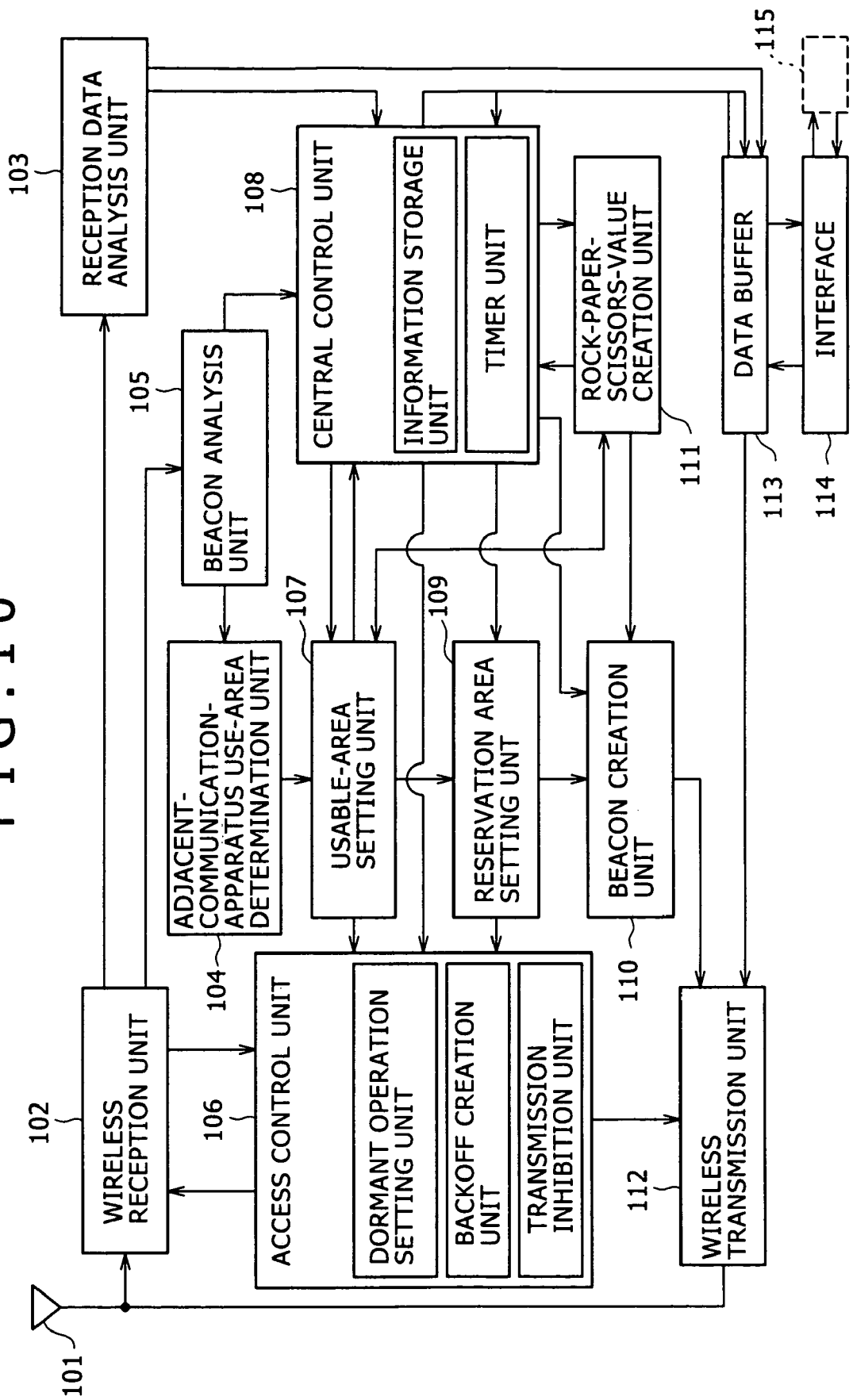
FIG. 10 schematically shows a function structure of a wireless communication apparatus that operates in a wireless network according to this embodiment.

FIG. 10 schematically shows a function structure of a wireless communication apparatus that operates in a wireless network according to this embodiment.

A wireless communication apparatus 100 shown in FIG. 10 includes an antenna 101, a wireless reception unit 102, reception data analysis unit 103, an adjacent-communication-apparatus use-area determination unit 104, a beacon analysis unit 105, an access control unit 106, a usable-area setting unit 107, a central control unit 108, a reservation area setting unit 109, a beacon creation unit 110, a rock-paper-scissors-value creation unit 111, a wireless transmission unit 112, a data buffer 113, and an interface 114.

The antenna 101 transmits wireless signals to other wireless communication apparatuses, or receives signals from other wireless communication apparatuses. In this embodiment, there is provided a single antenna, which cannot transmit and receive at the same time.

The wireless transmission unit 112 is a section for performing modulation processing to, for example, an ultra-wideband signal in order to transmit data temporarily stored in the data buffer 113 or the beacon signal. The wireless transmission unit 112 includes a modulator for modulating a transmission signal according to a specified modulation scheme such as OFDM (Orthogonal Frequency Division Multiplexing), a D/A converter for converting a digital transmission signal into an analog signal, an up-converter for upconverting an analog transmission signal, and a power amplifier (PA) for amplifying electric power of the upconverted transmission signal (each of them is not shown in the figure), and performs wireless transmission processing for an ultra-wideband signal at a specified transmission rate.

The wireless reception unit 102 performs reception processing on signals such as beacons and information transmitted from other wireless communication apparatuses, at specified times. The wireless reception unit 102 includes a low-noise amplifier (LNA) for amplifying voltage of an ultra-wideband signal received from other stations through the antenna 101, a down-converter for downconverting the amplified reception signal, an automatic gain controller (AGC), an A/D converter for converting an analog reception signal into a digital signal, synchronous processing for synchronization, channel estimation, and a demodulator for performing demodulation processing according to a demodulation scheme such as OFDM (each of them is not shown in the figure).

The reception data analysis unit 103 determines whether to process user data based on information extracted from the wireless reception unit 102. For example, the reception data analysis unit 103 analyzes data information and command information that are transmitted from an adjacent wireless communication apparatus and notifies the central control unit 108 of these pieces of information, and predetermined reservation processing is performed.

The data buffer 113 is used for temporarily storing data sent from a connected device through the interface 114 and data acquired at the reception data analysis unit 103 before sending out it to a connected device through the interface 114.

The interface 114 exchanges information with an external device 115 (e.g., a personal computer) connected to the wireless communication apparatus 100.

The rock-paper-scissors-value creation unit 111 creates a value for determining the relative superiority of reservations, that is, a rock-paper-scissors value in the case where the reservations have the same priority when there is a conflict of reservations between adjacent communication apparatuses of the invention. Basically, a rock-paper-scissors value of a frame is created for each superframe period.

The beacon creation unit 110 creates beacon signals periodically exchanged with an adjacent wireless communication apparatus. In this embodiment, a beacon signal is transmitted using a beacon time slot in a superframe period. There is mainly described information for managing a network in the beacon signal. The beacon frame structure is already discussed with reference to FIG. 5. This embodiment has a feature of creating a beacon signal that includes slot structure information describing reserved time slots, reservation types, etc. and a rock-paper-scissors value created by the rock-paper-scissors-value creation unit 111.

The beacon analysis unit 105 analyzes beacon signals received from other communication apparatuses and extracts information about the presence of an adjacent communication apparatus and slots to be used. In this embodiment, a beacon signal includes slot structure information describing reservation use status for each time slot, reservation types, etc. and rock-paper-scissors values for determining the relative superiority in the case of a conflict of reservation use, as described above. These pieces of information are sent to the adjacent-communication-apparatus use-area determination unit 104.

The adjacent-communication-apparatus use-area determination unit 104 determines whether or not the communication apparatus can use each time slot in the superframe period based on the slot use status extracted by the beacon analysis unit 105 at the previous stage.

The reservation area setting unit 109 acquires settings by the usable-area setting unit 107, finds a time slot to be reserved out of time slots that can be reserved for communication, and sets reservation use, in the case where there occurs transmission data that requires isochronous communication such as AV data so that reserved communication is needed. That is, the reservation area setting unit 109 performs the centralized management of slot positions etc. used for the communication and also manages the reservation types. A time slot allowing reserved communication refers to a time slot that is not in use by adjacent communication apparatuses, a time slot that another communication apparatus reserves at a lower priority, etc.

The usable-area setting unit 107 manages slots that are actually usable for communication out of the slots that the communication apparatus can use based on a determination result by the adjacent-communication-apparatus use-area determination unit 104.

The access control unit 106 performs control to operate as a transmitting, receiving, or standby state according to the slot use method when a start time for each time slot is notified, according to instructions from the usable-area setting unit 107 at the previous stage, the reservation area setting unit 109, and the central control unit 108. For example, in the case of reserved time slots, the access control unit 106 performs access control to initiate data transmission with a shorter frame period. Further, in the case of random access, the access control unit 106 performs access control to initiate data transmission after confirming that the transmission path is clear for just a relatively long frame period and further waiting just a backoff time.

The central control unit 108 performs in a unified way, a series of information transmissions, management of reception processing, and settings of access control over a transmission path in the wireless communication apparatus, by executing specified program code.

As shown in FIG. 10, the central control unit 108 includes an information storage unit and a timer unit. In the information storage unit, there are stored program code such as an execution process instruction for a series of access control operations executed at the central control unit 108 and information such as addresses of adjacent wireless communication apparatuses detected by beacon transmission/reception timing management. Further, at a specified period based on time information from the timer unit, control is exercised with activation such as beacon transmission timing of the apparatus and beacon reception timing from other communication apparatuses.

Next, process operation in a wireless communication system according to this embodiment will be described, with reference to FIGS. 11 to 16.

In the case where a conflict of reservation use occurs at some time slot, the competing communication apparatuses refer to their beacons between themselves to compare their reservation types, in the first place. A communication apparatus that has performed the reservation use of a higher priority continues the reservation use, but a communication apparatus that has performed the reservation use of a lower priority moves the reservation use to another area. Further, in the case where there is no superiority or inferiority in the reservation use priorities, the communication apparatuses further perform control by rock-paper-scissors based on the beacon descriptions, and the communication apparatus that has lost by the judgment changes its reservation use area.

Thus, since only one communication apparatus changes the reservation use area based on the reservation priorities or the control by rock-paper-scissors in the case where there is a conflict of reservation use, there is no risk that both communication apparatuses change the settings of the use bands and then another conflict occurs. Further, the conflict can be resolved directly between the competing communication apparatuses with low-load processing.

Figure 11:
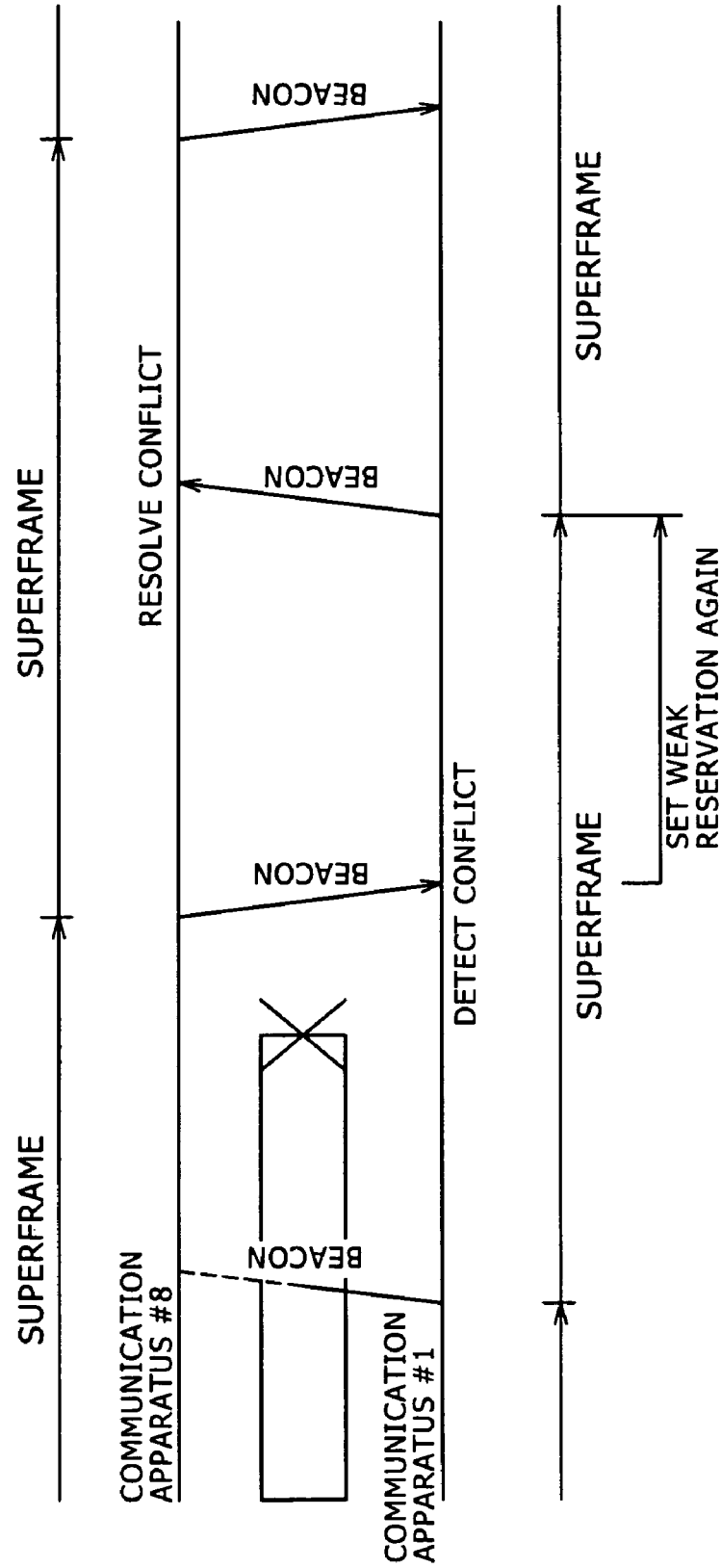
FIG. 11 shows an operation example illustrating that a communication apparatus having a weak reservation priority at a time slot where there is a conflict of reservation use sets again a time slot to be reserved.

FIG. 11 shows an operation example illustrating that a communication apparatus having a weak reservation priority at a time slot where there is a conflict of reservation use sets again a time slot to be reserved.

In the example shown in FIG. 11, the communication apparatuses #1 and #8 have become adjacent to each other, for example by removing a physical barrier which exists at first between the communication apparatuses #1 and #8 so that they cannot communicate with each other.

In the case where the communication apparatuses #1 and #8 can communicate with each other, the communication apparatus #1 receives a beacon signal from the communication apparatus #8 and detects a conflict of the slot to be used. In this example, since the reservation use priority of the communication apparatus #1 is inferior to that of the communication apparatus #8, the communication apparatus #1 sets the weak reservation use again in another slot.

The communication apparatus #1 sets the strong reservation use slot of the communication apparatus #8 as adjacent strong reservation use. Further, the communication apparatus #1 describes to the beacon the weak-reservation-use slot that has been set again, for notification of the slot use status.

On the other hand, the communication apparatus #8 receives from the communication apparatus #1 a beacon signal, where the strong-reservation-use slot of the communication apparatus #1 is set as adjacent strong reservation use; therefore, a use-slot conflict can be avoided.

Further, in order to detect the setting of the weak-reservation slot of the communication apparatus #1, the communication apparatus #8 sets the slot as an adjacent-weak-reservation slot, and describes it to the beacon for notification of the slot use status.

Figure 12:
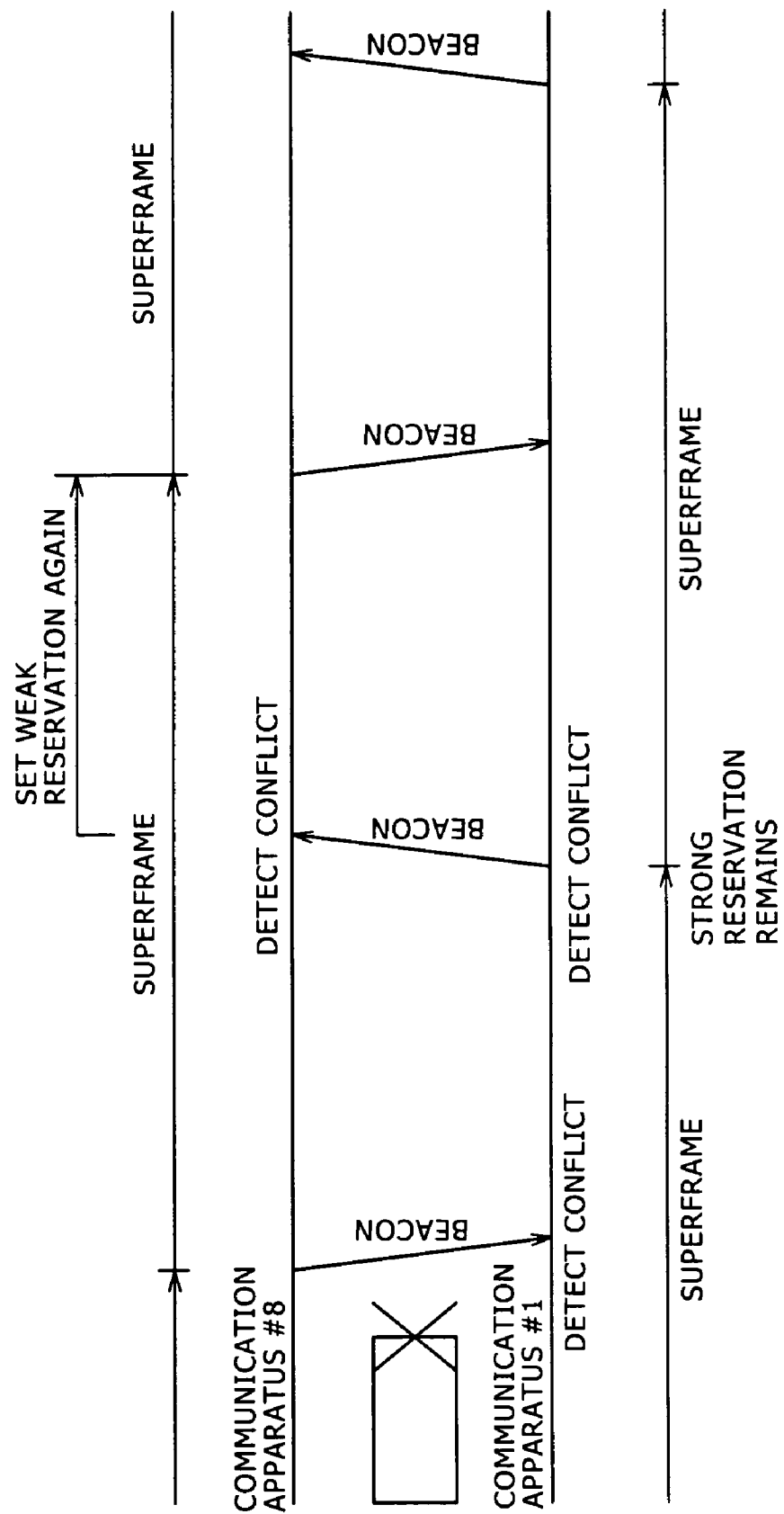
FIG. 12 shows an operation example illustrating that a communication apparatus having a strong reservation priority at a time slot where there is a conflict of reservation use continues the reservation use and a communication apparatus having a weak reservation priority sets again a time slot to be reserved.

FIG. 12 shows an operation example illustrating that a communication apparatus having a strong reservation priority at a time slot where there is a conflict of reservation use continues the reservation use and a communication apparatus having a weak reservation priority sets again a time slot to be reserved.

In the example shown in FIG. 12, the communication apparatuses #1 and #8 have become adjacent to each other, for example by removing a physical barrier which exists at first between the communication apparatuses #1 and #8 so that they cannot communicate with each other. It is shown in this example that the communication apparatus #8 sets the reservation again due to the setting of a lower priority.

In the case where the communication apparatuses #1 and #8 can communicate with each other, the communication apparatus #1 receives a beacon signal from the communication apparatus #8 and detects a conflict of the slot to be used. In this example, since the reservation use priority of the communication apparatus #1 is superior to that of the communication apparatus #8, the communication apparatus #1 does not need to set the reservation again.

Subsequently, the communication apparatus #8 receives a beacon signal from the communication apparatus #1 and detects a conflict of the slot to be used. Since the reservation use priority of the communication apparatus #8 is inferior to that of the communication apparatus #1, the communication apparatus #8 sets the weak reservation use again in another slot.

The communication apparatus #8 sets the strong-reservation-use slot of the communication apparatus #1 as adjacent strong reservation use. Further, the communication apparatus #8 describes to the beacon the weak-reservation-use slot that has been set again, for notification of the slot use status.

Figure 13:
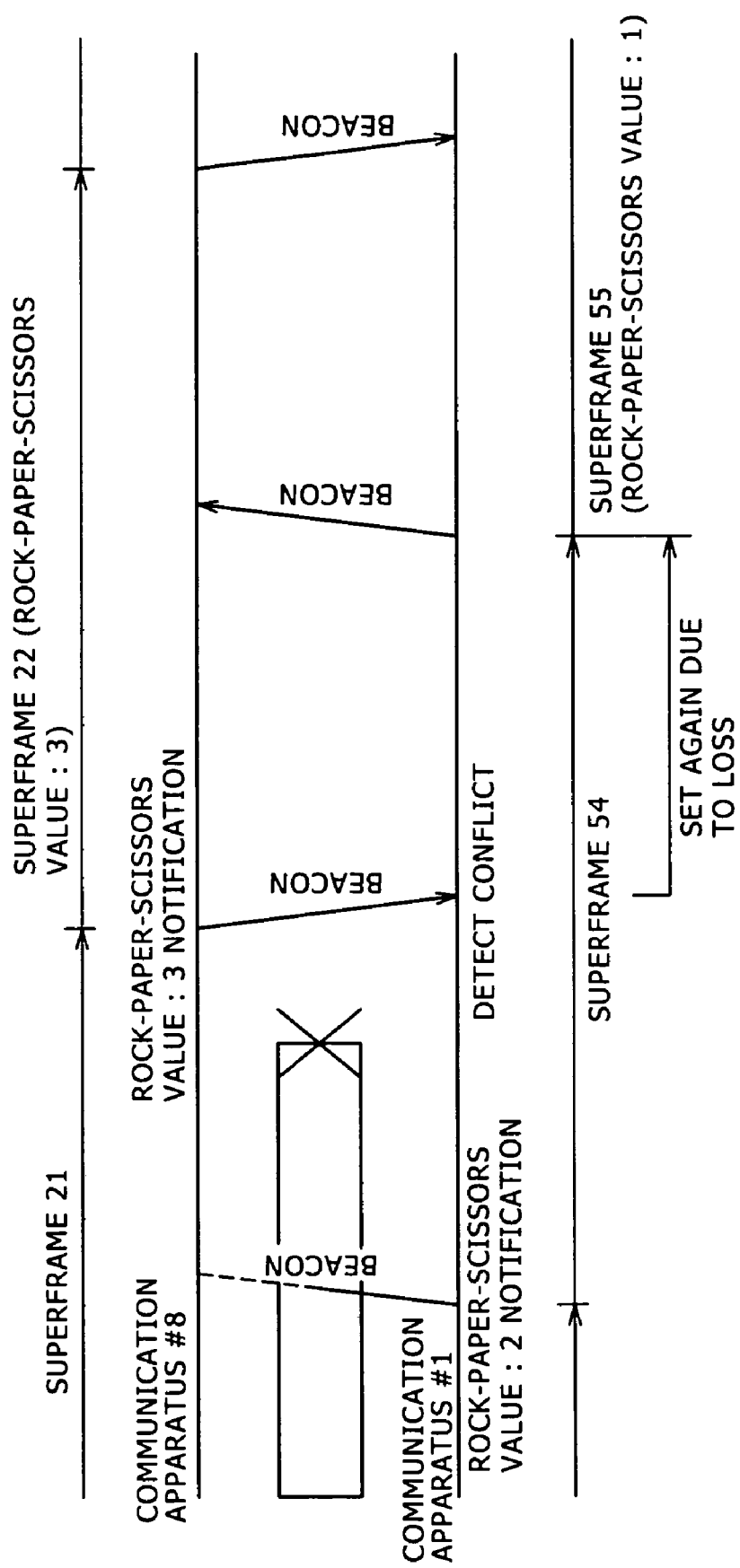
FIG. 13 shows an operation example illustrating that, in the case of the same priority of both reservations at a time slot where there is a conflict of reservation use, a communication apparatus that has lost by rock-paper-scissors sets again a time slot to be reserved.

FIG. 13 shows an operation example illustrating that, in the case of the same priority of both reservations at a time slot where there is a conflict of reservation use, a communication apparatus that has lost by rock-paper-scissors sets again a time slot to be reserved.

In the example shown in FIG. 13, the communication apparatuses #1 and #8 have become adjacent to each other, for example by removing a physical barrier which exists at first between the communication apparatuses #1 and #8 so that they cannot communicate with each other. It is shown in this example that even though the communication apparatus #1 has the setting of the same priority as that of the communication apparatus #8, the communication apparatus #1 sets the reservation again if it loses by comparing specified rock-paper-scissors values.

In the case where the communication apparatuses #1 and #8 can communicate with each other, the communication apparatus #1 receives a beacon signal from the communication apparatus #8 and detects a conflict of the slot to be used. In this example, since the reservation use priority of the communication apparatus #1 is the same as that of the communication apparatus #8, rock-paper-scissors values described in the beacon frames are further compared.

The rock-paper-scissors value shown with superframe 22 in the communication apparatus #8 is 3, whereas the rock-paper-scissors value shown with superframe 54 in the communication apparatus #1 is 2. As a result of the judgment, the communication apparatus #1 has lost and sets the reservation use again in another slot.

Subsequently, the communication apparatus #1 sets the reservation use slot of the communication apparatus #8 as adjacent reservation use. Further, the communication apparatus #1 describes to the beacon the reservation use slot that has been set again, for notification of the slot use status.

On the other hand, the communication apparatus #8 receives from the communication apparatus #1 a beacon signal, where the reservation use slot of the communication apparatus #8 is set as an adjacent-reservation-use slot; therefore, a use-slot conflict can be avoided.

Further, in order to detect the setting of the reservation slot of the communication apparatus #1, the communication apparatus #8 sets the slot as an adjacent-reservation-use slot, and describes it to the beacon for notification of the slot use status.

Figure 14:
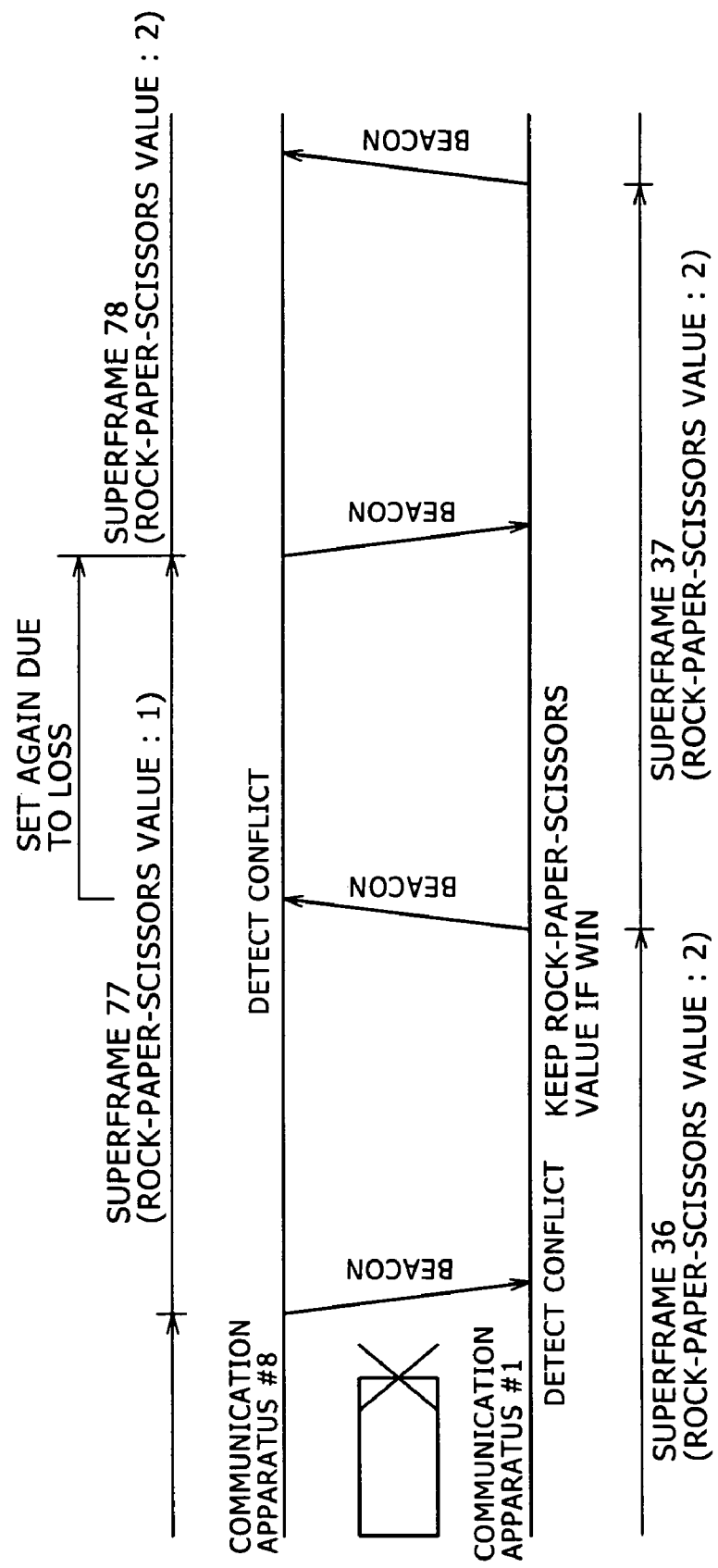
FIG. 14 shows an operation example illustrating that, in the case of the same priority of both reservations at a time slot where there is a conflict of reservation use, a communication apparatus that has won by rock-paper-scissors continues the reservation use and a communication apparatus that has lost sets again a time slot to be reserved.

FIG. 14 shows an operation example illustrating that, in the case of the same priority of both reservations at a time slot where there is a conflict of reservation use, a communication apparatus that has won by rock-paper-scissors continues the reservation use and a communication apparatus that has lost sets again a time slot to be reserved.

In the example shown in FIG. 14, the communication apparatuses #1 and #8 have become adjacent to each other, for example by removing a physical barrier which exists at first between the communication apparatuses #1 and #8 so that they cannot communicate with each other. It is shown in this example that even though the communication apparatus #8 has the setting of the same priority as that of the communication apparatus #1, the communication apparatus #8 sets the reservation again in another slot if it loses by comparing specified rock-paper-scissors values.

In the case where the communication apparatuses #1 and #8 can communicate with each other, the communication apparatus #1 receives a beacon signal from the communication apparatus #8 and detects a conflict of the slot to be used. In this example, since the reservation use priority of the communication apparatus #1 is the same as that of the communication apparatus #8, rock-paper-scissors values described in the beacon frames are further compared.

The rock-paper-scissors value shown with superframe 77 in the communication apparatus #8 is 1, whereas the rock-paper-scissors value shown with superframe 36 in the communication apparatus #1 is 2. As a result of the judgment, the communication apparatus #8 has lost. The communication apparatus #1 continues the reservation use, keeps the rock-paper-scissors value, and prompts the communication apparatus #8 to set its reservation again in another slot.

Subsequently, the communication apparatus #8 receives a beacon signal from the communication apparatus #1 and detects a conflict of the slot to be used. The communication apparatus #8 sets the reservation use again in another slot in the case of an inferior value by comparing the rock-paper-scissors values.

Subsequently, the communication apparatus #8 sets the reservation use slot of the communication apparatus #1 as adjacent reservation use. Further, the communication apparatus #8 describes to the beacon the reservation use slot that has been set again, for notification of the slot use status.

On the other hand, in order to detect the setting of the reservation slot of the communication apparatus #8, the communication apparatus #1 sets the slot as an adjacent-reservation slot, and describes it to the beacon for notification of the slot use status.

Figure 15:
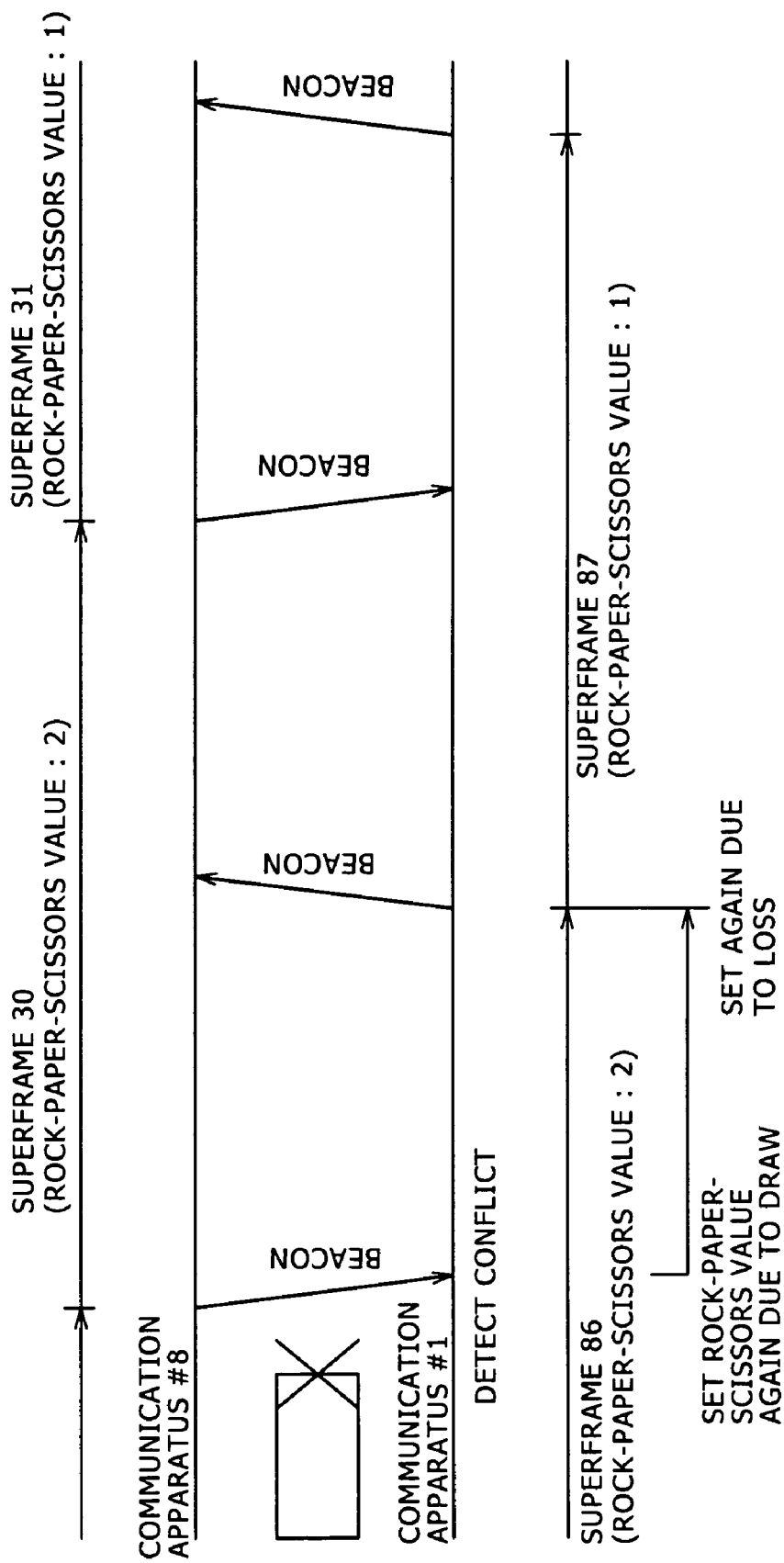
FIG. 15 shows an operation example illustrating that, in the case of the same priority of both reservations at a time slot where there is a conflict of the reservations, rock-paper-scissors values are set again after a draw of rock-paper-scissors, and a communication apparatus that has lost sets again a time slot to be reserved.

FIG. 15 shows an operation example illustrating that, in the case of the same priority of both reservations at a time slot where there is a conflict of reservation use, rock-paper-scissors values are set again after a draw of rock-paper-scissors, and a communication apparatus that has lost sets again a time slot to be reserved.

In the example shown in FIG. 15, the communication apparatuses #1 and #8 have become adjacent to each other, for example by removing a physical barrier which exists at first between the communication apparatuses #1 and #8 so that they cannot communicate with each other. It is shown in this example that even though the communication apparatus #1 has the setting of the same priority as that of the communication apparatus #8, the communication apparatus #1 sets the reservation again in another slot if it loses by comparing specified rock-paper-scissors values.

In the case where the communication apparatuses #1 and #8 can communicate with each other, the communication apparatus #1 receives a beacon signal from the communication apparatus #8 and detects a conflict of the slot to be used. In this example, since the reservation use priority of the communication apparatus #1 is the same as that of the communication apparatus #8, rock-paper-scissors values described in the beacon frames are further compared. If the rock-paper-scissors is a draw by the comparison, a rock-paper-scissors value to be set by the rock-paper-scissors-value creation unit 111 in the subsequent superframe period is extracted in advance and the relative superiority of the value is evaluated. If it loses, the communication apparatus #1 sets the reservation use again in another slot.

The rock-paper-scissors value shown with superframe 30 in the communication apparatus #8 is 2, whereas the rock-paper-scissors value shown with superframe 86 in the communication apparatus #1 is 2. Since the rock-paper-scissors is a draw, the rock-paper-scissors value 1 is created in superframe 87. As a result of the judgment, the communication apparatus #1 has lost and sets the reservation use again in another slot.

Subsequently, the communication apparatus #1 sets the reservation use slot of the communication apparatus #8 as adjacent reservation use. Further, the communication apparatus #1 describes to the beacon the reservation use slot that has been set again, for notification of the slot use status.

On the other hand, the communication apparatus #8 receives from the communication apparatus #1 a beacon signal, where the reservation use slot of the communication apparatus #8 is set as an adjacent-reservation-use slot; therefore, a use-slot conflict can be avoided.

Further, in order to detect the setting of the reservation slot of the communication apparatus #1, the communication apparatus #8 sets the slot as an adjacent-reservation-use slot, and describes it to the beacon for notification of the slot use status.

Figure 16:
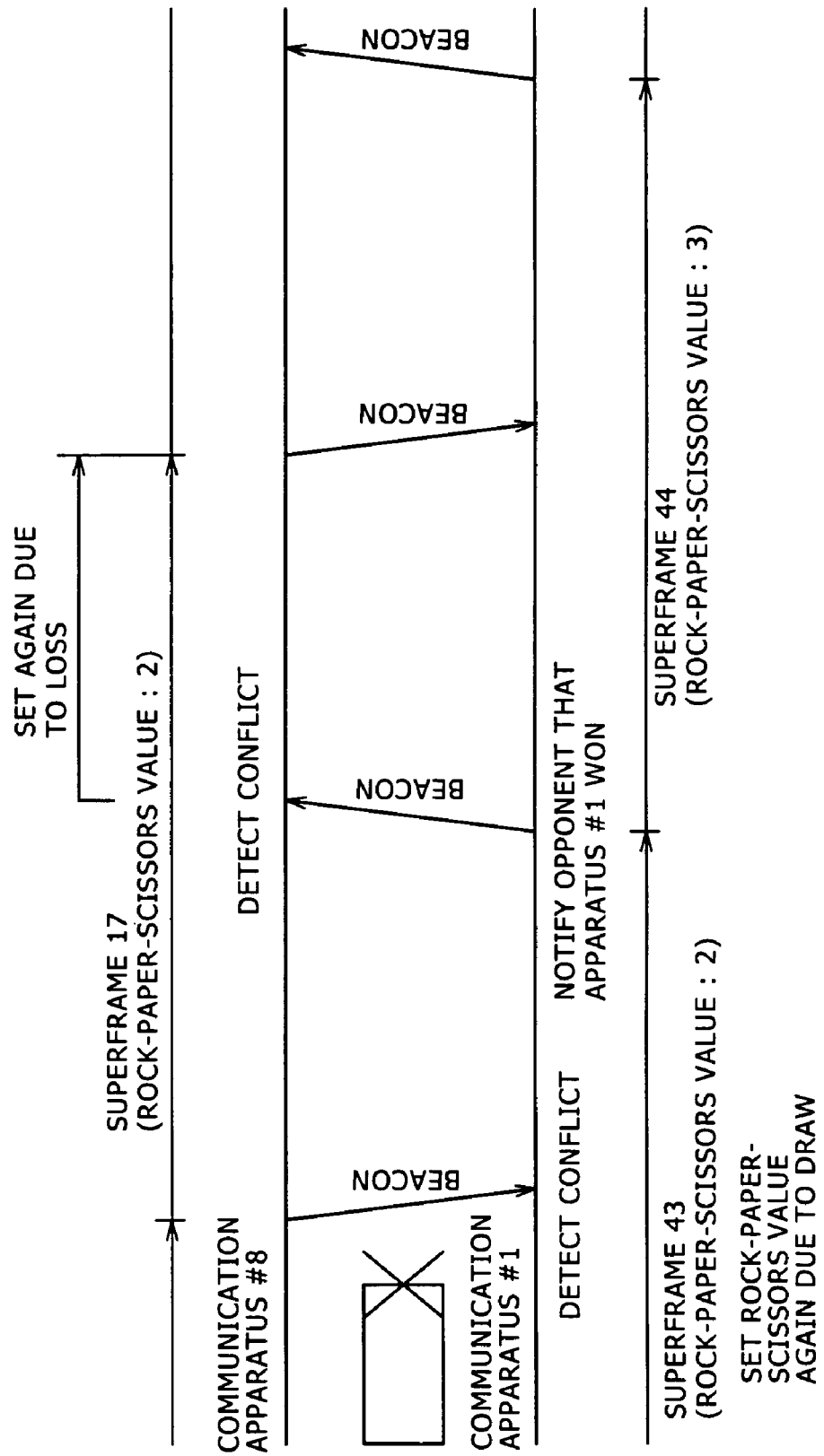
FIG. 16 shows an operation example illustrating that, in the case of the same priority of both reservations at a time slot where there is a conflict of reservation use, rock-paper-scissors values are set again after a draw of rock-paper-scissors, a communication apparatus that has won continues the reservation use, and a communication apparatus that has lost sets again a time slot to be reserved.

FIG. 16 shows an operation example illustrating that, in the case of the same priority of both reservations at a time slot where there is a conflict of reservation use, rock-paper-scissors values are set again after a draw of rock-paper-scissors, a communication apparatus that has won continues the reservation use, and a communication apparatus that has lost sets again a time slot to be reserved.

In the example shown in FIG. 16, the communication apparatuses #1 and #8 have become adjacent to each other, for example by removing a physical barrier which exists at first between the communication apparatuses #1 and #8 so that they cannot communicate with each other. It is shown in this example that even though the communication apparatus #8 has the setting of the same priority as that of the communication apparatus #1, the communication apparatus #8 sets the reservation again in another slot if it loses by comparing specified rock-paper-scissors values.

In the case where the communication apparatuses #1 and #8 can communicate with each other, the communication apparatus #1 receives a beacon signal from the communication apparatus #8 and detects a conflict of the slot to be used. In this example, since the reservation use priority of the communication apparatus #1 is the same as that of the communication apparatus #8, rock-paper-scissors values described in the beacon frames are further compared. If the rock-paper-scissors is a draw by the comparison, a rock-paper-scissors value to be set by the rock-paper-scissors-value creation unit 111 in the subsequent superframe period is extracted in advance and the relative superiority of the value is evaluated. The communication apparatus #1 prompts the communication apparatus #8 to set its reservation use again in another slot if the communication apparatus #1 wins.

The rock-paper-scissors value shown with superframe 17 in the communication apparatus #8 is 2, whereas the rock-paper-scissors value shown with superframe 46 in the communication apparatus #1 is 2. Since the rock-paper-scissors is a draw, the rock-paper-scissors value 3 is created in superframe 44. As a result of the judgment, the communication apparatus #8 has lost. The communication apparatus #1 continues the reservation use, sets the rock-paper-scissors value, and prompts the communication apparatus #8 to set its reservation again in another slot.

Subsequently, the communication apparatus #8 receives a beacon signal from the communication apparatus #1 and detects a conflict of the slot to be used. The communication apparatus #8 sets the reservation use again in another slot in the case of an inferior value by comparing the rock-paper-scissors values.

The communication apparatus #8 sets the reservation use slot of the communication apparatus #1 as adjacent reservation use. Further, the communication apparatus #8 describes to the beacon the reservation use slot that has been set again, for notification of the slot use status.

On the other hand, in order to detect the setting of the reservation slot of the communication apparatus #8, the communication apparatus #1 sets the slot as an adjacent-reservation slot, and describes it to the beacon for notification of the slot use status.

Figure 17:
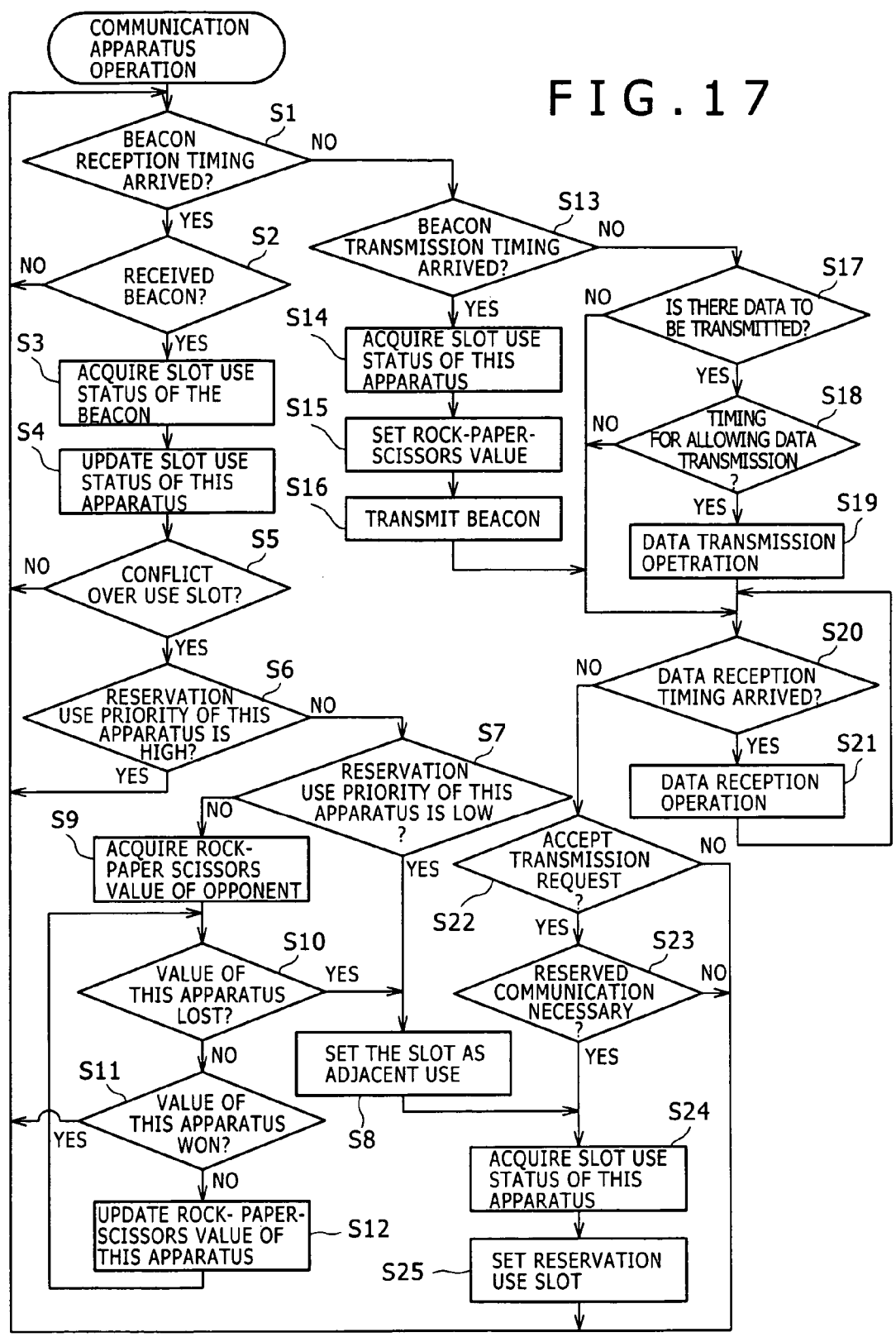
FIG. 17 is a flowchart showing the operation in a wireless communication apparatus.

FIG. 17 is a flowchart showing the operation in the wireless communication apparatus. In practice, the operation is realized when the central control unit 108 executes program code stored in the information storage unit. The wireless communication apparatus can mediate a conflict of reservation use over a time slot, in accordance with the operation process.

First, if there arrives a timing for receiving beacons of adjacent communication apparatuses or an arbitrary beacon scan timing at a beacon time slot (step S1), the communication apparatus performs a beacon reception operation. If the apparatus has received a beacon (step S2), the apparatus acquires a slot use status described in the beacon (step S3), and updates a slot use status of itself (step S4). That is, the apparatus registers a slot that an adjacent communication apparatus has set a reservation in, as an adjacent-reservation-use slot.

Subsequently, the apparatus checks whether or not there is a conflict over a slot reserved by the apparatus (step S5). If there is a conflict over the reserved slot, the priorities of both reservations are further compared (step 6). If the priority of the apparatus is higher, the apparatus continues to use the slot. On the other hand, if the priority of the apparatus is lower (step S7), the apparatus sets the slot as adjacent reservation use (step S8), and sets another slot for use by the apparatus at step S24.

Further, as a result of the determinations at steps 6 and 7, if the priorities are the same, the apparatus further acquires a rock-paper-scissors value added to the beacon (step S9), compares it with the rock-paper-scissors value of the apparatus in the superframe (step 10), and performs rock-paper-scissors control.

If the apparatus loses at the rock-paper-scissors, the apparatus sets the slot as adjacent reservation use at step S8, and sets another slot for use by the apparatus at step S24.

On the other hand, if the apparatus wins at the rock-paper-scissors (step S11), the apparatus continues to use the slot.

Further, if the rock-paper-scissors is a draw, the apparatus updates the rock-paper-scissors of itself (step S12), and again compares rock-paper-scissors values at step S10.

Further, if there arrives a timing for transmitting a beacon of the apparatus at a beacon time slot (step S13), the apparatus acquires a slot use status of itself (step S14), sets a rock-paper-scissors value (step S15), and configures a beacon frame to transmit the beacon signal at a specified timing (step S16). However, if the apparatus wins at rock-paper-scissors at the time of the preceding beacon reception, the apparatus keeps the rock-paper-scissors value.

Furthermore, if there is data waiting for being transmitted (step S17), the apparatus checks to the receiving communication apparatus whether it is a timing for allowing the apparatus to transmit data (step S18). If it is a timing for allowing the data transmission, the apparatus transmits the data (step S19) Further, if there arrives a preset timing for receiving data (step S20), the apparatus performs a data reception operation (step S21).

Furthermore, if a timing for receiving data has not arrived and the apparatus accepts a data transmission request from the interface (step S22), the apparatus determines whether a reservation use setting is necessary (step S23). If a reservation use setting is necessary, the apparatus acquires a slot use status of itself (step S24), and sets a settable time slot as a reservation use slot (step S25).

Further, if the apparatus has not accepted a data transmission request or a reservation use setting is not necessary, the process returns to step S1 and a series of steps is repeated.

FIG. 18 is a flowchart showing the operation process for acquiring the slot use status and setting reservation use in steps S24 and S25 shown in FIG. 17.

First, the communication apparatus acquires position (time) information about vacant slots which the communication apparatus has not reserved (step S101), and further retrieves a position (time) of a vacant slot which adjacent communication apparatuses also have not reserved (step S102).

If there is a vacant slot which has not been reserved, the apparatus sets a reservation in the slot at step S108.

On the other hand, if there is not any vacant slot which has not been reserved (S103), the apparatus acquires a priority parameter for a new reservation (step S104).

Next, the apparatus acquires priority parameters of slots reserved by adjacent communication apparatuses (step S105), and determines whether or not there is a slot out of these slots that has a lower priority than that of a new reservation (step S106).

If there is no slot having a lower priority, this means an available vacant slot does not exist at all, and it is impossible to set a reservation any more.

On the other hand, if there are slots having a lower priority, the apparatus retrieves a slot having the lowest priority out of these slots (step S107), and sets a higher-priority reservation in the slot (step S108).

The present invention has been described in detail with reference to a specific embodiment. However, it is obvious that those skilled in the art can alter or modify the embodiment without departing from the scope and sprit of the invention.

This specification has described a primary embodiment in the case of resolving the conflict by mediating it with low-load processing when there occurs a conflict between communication stations that have reserved a band in an autonomous distributed wireless network. However, the scope and sprit of the invention is not limited to this.

For example, the present invention can be applied to a wireless network in which communication stations operate under a particular control station, as well as the autonomous distributed wireless network.

Further, this specification has described the embodiment in which the present invention is applied to a wireless communication system where communication stations in network operation notify each other of beacon signals. However, the invention can also be applied to a system where only a part of the communication stations notify each other of beacon signals.

That is, the present invention has been disclosed in the form of exemplification, and the contents of the specification should not be interpreted restrictively. To understand the subject matter of the present invention, the appended claims should be taken into consideration.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication system in which communication apparatuses perform band reservation to reserve a communication band for use, a plurality of reservation types each defining a different priority for a band reservation, and to handle a conflict of band reservation use between two or more communication apparatuses, the wireless communication system comprising:
   means for comparing reservation type defining priority of each of the communication apparatuses having a conflicting band reservation;
   means for continuing band reservation use of a first communication apparatus having a reservation type of a higher priority than a second communication apparatus having a reservation type of a lower priority; and
   means for moving band reservation use of the second communication apparatus having the reservation type of the lower priority to another area.

2. The wireless communication system according to claim 1, wherein communication apparatuses notify each other of their respective band reservation and reservation type through a beacon time slot.

3. The wireless communication system according to claim 1, wherein a communication apparatus that moves band reservation use tries to move the band reservation use to a vacant band or a band where priority of the communication apparatus defined by reservation type is superior to priority of a different communication apparatus that has performed band reservation on the band.

4. A wireless communication system in which communication apparatuses perform band reservation to reserve a communication band for use, the wireless communication system comprising:
   means for notifying between communication apparatuses a beacon signal that includes information about a band reservation of each communication apparatus and superiority-or-inferiority determination information that is used for superiority-or-inferiority determination when there is a conflict of band reservation;
   means for comparing superiority-or-inferiority determination information between communication apparatuses when a conflict of band reservation arises between two or more communication apparatuses;
   means for continuing band reservation use of a communication apparatus having the conflict of band reservation that has a higher priority based on the superiority-or-inferiority determination information; and
   means for moving band reservation use of a communication apparatus having the conflict of band reservation that has a lower priority based on the superiority-or-inferiority determination information, to another area.

5. The wireless communication system according to claim 4, wherein each communication apparatus creates a rock-paper-scissors value as the superiority-or-inferiority determination information, describes it in a beacon signal, compares the rock-paper-scissors value with that of a competing communication apparatus when there is a conflict of band reservation, determines a priority based on an outcome of comparing rock-paper-scissors values, and determines whether or not to move its band reservation use.

6. The wireless communication system according to claim 4, wherein a plurality of reservation types that have different priorities are used to define a reservation type for a band reservation, the wireless communication system further comprising:
   means for describing in a beacon by each communication apparatus, information about a band reservation of each communication apparatus and a reservation type thereof;
   means for determining which communication apparatus should move its reservation use based on comparing priority of band reservation between communication apparatuses when there occurs a conflict of band reservation between two or more communication apparatuses; and
   means for determining which communication apparatus should move its band reservation based on further comparing superiority-or-inferiority determination information when priorities of band reservations are the same.

7. A wireless communication apparatus for performing data transmission by band reservation under a wireless communication environment in which a plurality of reservation types that have different priorities are defined, the wireless communication apparatus comprising:
   a communication device configured to transmit and receive wireless data on a channel;
   a communication controller configured to control data transmission and reception at the communication device;
   a beacon creating device configured to create a beacon signal that includes information about a band reservation of the wireless communication apparatus and a reservation type defining priority thereof;
   a beacon analyzer configured to analyze a beacon signal received from an adjacent communication apparatus; and
   a usable-band setting device configured to set a usable band based on the band reservation of the wireless communication apparatus and a result of analyzing the beacon signal received from the adjacent communication apparatus.

8. The wireless communication apparatus according to claim 7, wherein the usable-band setting device compares priorities of the wireless communication apparatus and another communication apparatus that competes with the wireless communication apparatus for reservation use at a band, the wireless communication apparatus continues its reservation use if the priority of the wireless communication apparatus is superior, and the wireless communication apparatus moves its reservation use to another band if the priority of the wireless communication apparatus is inferior.

9. The wireless communication apparatus according to claim 8, wherein the usable-band setting device tries to move the reservation use to a vacancy band or a band where the priority of the wireless communication apparatus is superior to that of a different communication apparatus that has performed reservation use on the band.

10. A wireless communication apparatus for performing data transmission by band reservation reserving a communication band for use, the wireless communication apparatus comprising:
   a communication device configured to transmit and receive wireless data on a channel;

a communication controller configured to control data transmission and reception at the communication device;

a superiority-or-inferiority determination information creating device configured to create superiority-or-inferiority determination information used for superiority-or-inferiority determination when there is a conflict of reservation use;

a beacon creating device configured to create a beacon signal that includes information about a reservation use band of the wireless communication apparatus and superiority-or-inferiority determination information;

a beacon analyzer configured to analyze a beacon signal received from an adjacent communication apparatus; and a usable-band setting device configured to set a usable band based on the reservation use band of the wireless communication apparatus, the superiority-or-inferiority determination information, and a result of analyzing the beacon signal from the adjacent communication apparatus.

11. The wireless communication apparatus according to claim 10, wherein the usable-band setting device compares superiority-or-inferiority determination information of the wireless communication apparatus and that of another communication apparatus that competes with the wireless communication apparatus for reservation use at a band, the wireless communication apparatus continues its reservation use if the priority of the wireless communication apparatus is superior, and the wireless communication apparatus moves its reservation use to another band if the priority of the wireless communication apparatus is inferior.

12. The wireless communication apparatus according to claim 10, wherein the superiority-or-inferiority determination information creating device creates a rock-paper-scissors value as the superiority-or-inferiority determination information and describes it in a beacon, and the usable-band setting device compares the rock-paper-scissors value with that of a competing apparatus, determines a priority based on an outcome of comparing rock-paper-scissors values, and determines whether or not to move its reservation use.

13. The wireless communication apparatus according to claim 10, wherein the wireless communication apparatus operates under a wireless communication environment in which a plurality of reservation types that have different priorities are defined, the beacon creating device describes information about a reservation use band of the wireless communication apparatus and a reservation type thereof, in a beacon, the usable-band setting device determines which communication apparatus should move its reservation use based on comparing reservation use priorities between competing communication apparatuses if there occurs a conflict of band reservation use, and determines which communication apparatus should move its reservation use based on further comparing superiority-or-inferiority determination information if the reservation use priorities are the same.

14. A wireless communication method for performing data transmission by band reservation, reserving a communication band for use, under a wireless communication environment in which a plurality of reservation types that have different priorities are defined, the wireless communication method comprising:

a beacon notification step of creating and notifying a beacon signal that includes information about a band reservation of a wireless communication apparatus and a reservation type thereof;

a beacon analysis step of analyzing a beacon signal received from an adjacent communication apparatus; and a usable-band setting step of setting a usable band based on the band reservation of the wireless communication apparatus and a result of analyzing the beacon signal from the adjacent communication apparatus.

15. A wireless communication method for performing data transmission by band reservation reserving a communication band for use, the wireless communication method comprising:

a superiority-or-inferiority determination information creating step of creating superiority-or-inferiority determination information used for superiority-or-inferiority determination when there is a conflict of band reservation;

a beacon notification step of creating and notifying a beacon signal that includes information about a band reservation of a wireless communication apparatus and superiority-or-inferiority determination information;

a beacon analysis step of analyzing a beacon signal received from an adjacent communication apparatus; and a usable-band setting step of setting a usable band based on the band reservation of the wireless communication apparatus, the superiority-or-inferiority determination information, and a result of analyzing the beacon signal from the adjacent communication apparatus.

16. A information storage unit configured to store therein a computer program, the computer program, when executed by a computer processor, causing the computer processor to perform a data transmission method for performing data transmission by band reservation reserving a communication band for use under a wireless communication environment in which a plurality of reservation types that have different priorities are defined, the data transmission method comprising:

a beacon notification step of creating and notifying a beacon signal that includes information about a band reservation of a wireless communication apparatus and a reservation type thereof;

a beacon analysis step of analyzing a beacon signal received from an adjacent communication apparatus; and a usable-band setting step of setting a usable band based on the band reservation of the wireless communication apparatus and a result of analyzing the beacon signal from the adjacent communication apparatus.

17. An information storage unit configured to store therein a computer program, the computer program, when executed by a computer processor, causing the computer processor to perform a wireless communication method including data transmission by band reservation reserving a communication band for use, the wireless communication method comprising:

a superiority-or-inferiority determination information creating step of creating superiority-or-inferiority determination information used for superiority-or-inferiority determination if there is a conflict of reservation use;

a beacon notification step of creating and notifying a beacon signal that includes information about a band reservation of a wireless communication apparatus and superiority-or-inferiority determination information;

a beacon analysis step of analyzing a beacon signal received from an adjacent communication apparatus; and a usable-band setting step of setting a usable band based on the band reservation of the wireless communication apparatus, the superiority-or-inferiority determination information, and a result of analyzing the beacon signal from the adjacent communication apparatus.

* * * * *